US007667646B2

(12) United States Patent
Kalliola et al.

(10) Patent No.: US 7,667,646 B2
(45) Date of Patent: Feb. 23, 2010

(54) SYSTEM AND METHODS FOR DIRECTION FINDING USING A HANDHELD DEVICE

(75) Inventors: Kimmo Kalliola, Helsinki (FI); Klaus Doppler, Espoo (FI); Hannu Kauppinen, Helsinki (FI); Joni Jantunen, Helsinki (FI); Jani Ollikainen, Helsinki (FI); Tuukka Lehtiniemi, Helsinki (FI); Antti Kainulainen, Espoo (FI); Juha O Juntunen, Espoo (FI)

(73) Assignee: Nokia Corporation, Espoo (FI)

( * ) Notice: Subject to any disclaimer, the term of this patent is extended or adjusted under 35 U.S.C. 154(b) by 802 days.

(21) Appl. No.: 11/357,165

(22) Filed: Feb. 21, 2006

(65) Prior Publication Data

US 2007/0197229 A1   Aug. 23, 2007

(51) Int. Cl.
G01S 5/02 (2006.01)
G01S 5/04 (2006.01)
(52) U.S. Cl. ...................... 342/417; 342/443
(58) Field of Classification Search ................. 342/443, 342/417
See application file for complete search history.

(56) References Cited

U.S. PATENT DOCUMENTS

| | | | |
|---|---|---|---|
| 5,515,061 A | 5/1996 | Hiltz et al. | |
| 6,075,442 A | 6/2000 | Welch | |
| 6,246,376 B1 * | 6/2001 | Bork et al. | 342/357.13 |
| 6,430,498 B1 * | 8/2002 | Maruyama et al. | 342/357.08 |
| 6,504,503 B1 * | 1/2003 | Saint-Hilaire et al. | 342/357.08 |
| 6,778,902 B2 | 8/2004 | Hathiram et al. | |
| 6,807,159 B1 | 10/2004 | Shorey et al. | |
| 6,944,457 B2 | 9/2005 | Alinikula et al. | |
| 7,353,034 B2 * | 4/2008 | Haney | 455/456.1 |
| 2004/0038645 A1 | 2/2004 | Reunamaki et al. | |
| 2004/0214527 A1 | 10/2004 | Lim et al. | |
| 2004/0266494 A1 | 12/2004 | Ruuska et al. | |
| 2005/0014468 A1 | 1/2005 | Salokannel et al. | |
| 2005/0020322 A1 | 1/2005 | Ruuska et al. | |

(Continued)

FOREIGN PATENT DOCUMENTS

WO   02073818 A1   9/2002

(Continued)

OTHER PUBLICATIONS

Krim et al., "Two Decades of Array Signal Processing Research: The Parametric Approach", IEEE Signal Processing Magazine, Jul. 1996, p. 67-91.

(Continued)

*Primary Examiner*—Thomas H Tarcza
*Assistant Examiner*—Fred H Mull
(74) *Attorney, Agent, or Firm*—Locke Lord Bissell & Liddell

(57) ABSTRACT

A system for indicating the relative direction of a target object or location as determined from the current position of a wireless communication device. The system employs Direction of Arrival determination using an antenna array for indicating the direction of a target device and includes facilities to activate a location-indicating transmission in a target device, the ability to request that a location-indicating transmission be activated in a remote target device, relevant information reception from a target device and the display of all potential target devices within effective transmission range of the wireless communication device.

21 Claims, 15 Drawing Sheets

U.S. PATENT DOCUMENTS

2005/0181726 A1* 8/2005 Gottlieb et al. .......... 455/456.3

FOREIGN PATENT DOCUMENTS

WO    03100452 A1    12/2003

OTHER PUBLICATIONS

Honkanen et al., "Low End Extension For Bluetooth", Sep. 9, 2004, 4 pages, IEEE, Atlanta, GA, USA.

LAN/MAN Standards Committee, "Part 15.4: Wireless Medium Access Control (MAC) and Physical Layer (PHY) Specifications for Low-Rate Wireless Personal Area Networks (LR-WPANs)", IEEE Standards, Oct. 1, 2003, p. 1-679, IEEE, New York, NY, USA.
U.S. Appl. No. 11/761,803, filed Jun. 12, 2007, Jantunen et al.
Colin Swindells, et al., "That One there! Pointing to Establish Device Identify", XP-002338349,vol. 4, Issue2, p. 151-160.
Http://www.cbs.com/primetime/csi_miami/episodes.320/, retrieved Apr. 11, 2007.

* cited by examiner

FIG. 7
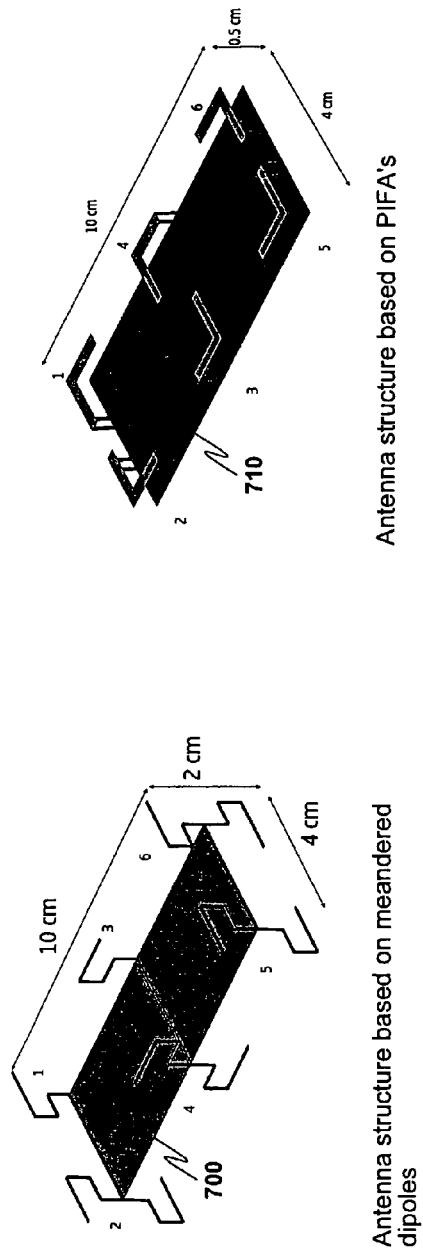
Antenna structure based on PIFA's
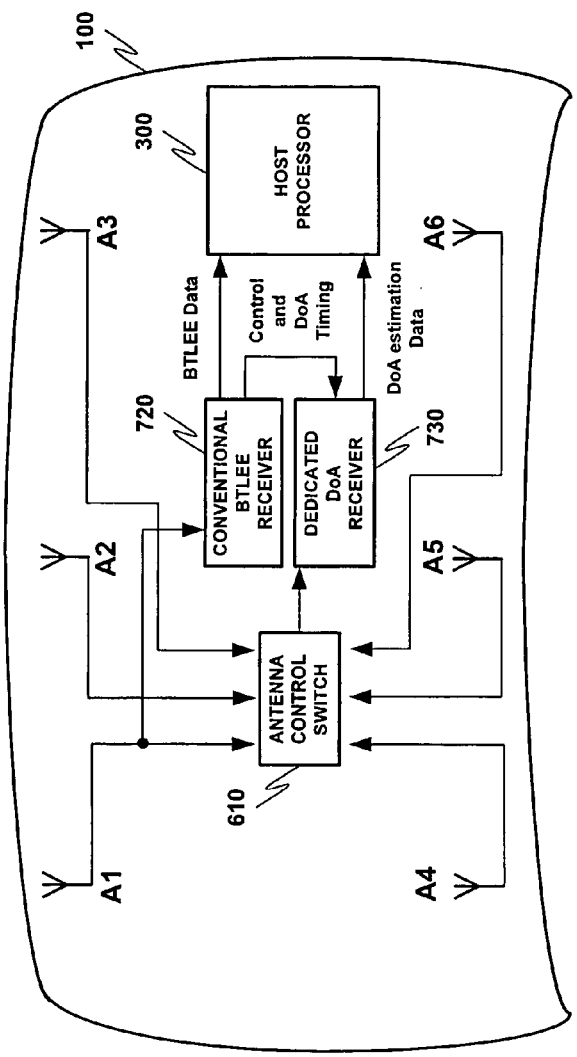
Antenna structure based on meandered dipoles

SYSTEM AND METHODS FOR DIRECTION FINDING USING A HANDHELD DEVICE

BACKGROUND OF THE INVENTION

The present invention relates to a system for wireless direction-finding and location, and more specifically, to an automated system for identifying target devices and relevant target device information in order to determine a relative direction towards the target device from the current location of the seeking device.

Description of Prior Art

Modern society has quickly adopted, and become reliant upon, handheld devices for wireless communication. For example, cellular telephones continue to proliferate in the global marketplace due to technological improvements in both the quality of the communication and the functionality of the devices. These wireless communication devices (WCDs) have become commonplace for both personal and business use, allowing users to transmit and receive voice, text and graphical data from a multitude of geographic locations. The communication networks utilized by these devices span different frequencies and cover different transmission distances, each having strengths desirable for various applications.

Cellular networks facilitate WCD communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHz-1.8 GHz band in Europe and at 1.9 GHz in the United States. This network provides voice communication and also supports the transmission of textual data via the Short Messaging Service (SMS). SMS allows a WCD to transmit and receive text messages of up to 160 characters, while providing data transfer to packet networks, ISDN and POTS users at 9.6 Kbps. The Multimedia Messaging Service (MMS), an enhanced messaging system allowing for the transmission of sound, graphics and video files in addition to simple text, has also become available in certain devices. Soon emerging technologies such as Digital Video Broadcasting for Handheld Devices (DVB-H) will make streaming digital video, and other similar content, available via direct transmission to a WCD. While long-range communication networks like GSM are a well-accepted means for transmitting and receiving data, due to cost, traffic and legislative concerns, these networks may not be appropriate for all data applications.

Short-range wireless networks provide communication solutions that avoid some of the problems seen in large cellular networks. Bluetooth™ is an example of a short-range wireless technology quickly gaining acceptance in the marketplace. A Bluetooth™ enabled WCD transmits and receives data at a rate of 720 Kbps within a range of 10 meters, and may transmit up to 100 meters with additional power boosting. A user does not actively instigate a Bluetooth™ network. Instead, a plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other piconet members. In addition to Bluetooth™ other popular short-range wireless networks include WLAN (of which "Wi-Fi" local access points communicating in accordance with the IEEE 802.11 standard, is an example), WUSB, UWB, Bluetooth Low End Extension (BTLEE)/BluLite, ZigBee/IEEE 802.15.4, and UHF RFID. All of these wireless mediums have features and advantages that make them appropriate for various applications.

More recently, manufacturers have also began to incorporate various resources for providing enhanced functionality in WCDs (e.g., components and software for performing close-proximity wireless information exchanges). Sensors and/or scanners may be used to read visual or electronic information into a device. A transaction may involve a user holding their WCD in proximity to a target, aiming their WCD at an object (e.g., to take a picture) or sweeping the device over a printed tag or document. Machine-readable technologies such as radio frequency identification (RFID), Infra-red (IR) communication, optical character recognition (OCR) and various other types of visual, electronic and magnetic scanning are used to quickly input desired information into the WCD without the need for manual entry by a user.

Wireless communication devices employing the previously discussed characteristics may be used for a variety of applications other than basic voice communications. Exemplary applications for business may include scheduling, word processing, spreadsheets, facsimile transmission, contact management, etc. There is also a multitude of applications for the personal enjoyment of the user, such as games, instant messaging, display wallpaper, etc.

A wireless service provider may determine the location of a wireless communication device by how it is communicating on the wireless network (e.g., by identifying the cell where a cellular phone last accessed the network). While the benefit of being able to locate a communication device in certain situations is apparent, such as in an emergency, the ability to provide location-related information to a user would also be a great advantage. Exemplary systems now envisioned might empower a user to determine a current location using their WCD, and combined with other applications, may be useful for route or direction finding from a current location to another mapped location.

Current handheld location systems that operate with services such as the Global Positioning System (GPS) are now available on the market. These standalone devices may provide bearings and directions to address locations or longitude/latitude positions. However, the bearings and directions may only be provided relative to the moving direction of the GPS device. For stationary devices they can't be provided at all. Manufacturers have integrated these location-finding features with traditional wireless communication devices.

However, even with the ability to determine the current position of a device, the usefulness of these emerging navigation systems is somewhat limited. What if the user has not yet determined their destination? In most status quo location systems the user must first indicate the object of their search to the navigation system. For example, the user must provide a destination address for a target destination before the navigational system may provide directional information. However, a person in an unfamiliar area may be currently unaware of the multitude of possible target destinations that might be of interest? What if the user desires to find a location on a much smaller scale, such as a room in a building that may not be established by a regional address? What if the destination is mobile, like the location of the closest taxi cab or police car in the immediate area? In an alternative application, what if the target is a thing (object) not a place (destination)? A person might want to find the current location of a set of keys, a wallet, a jacket, the wireless communication device of another user, etc. The current location technologies that are integrated into wireless communication devices have not been envisioned to provide for these alternative situations.

What is therefore needed is a directional and/or location finding system that does not require as a prerequisite a user's knowledge of what they seek. Instead, when activated, the directional and/or location finding system should enable the user to manually input a desired target, manually activate (or request the activation of) a target that is currently inactive, as well as providing a list of potential targets to a user, which allows the user to select the target of the directional search, be it either a place or object. In the case of selecting a target from the array of discovered targets, the targets may be identified to the user and may in some cases also provide additional information relevant to the nature of the target. After a target is indicated, the user should be directed to the target through a simple interface that may indicate both the present user location and the relative direction to the target from this location.

SUMMARY OF INVENTION

The present invention includes at least a method, device, software program and system for determining the relative direction towards a target from the current position of a wireless communication device. The system includes provisions for the ability to activate a location-indicating transmission in a target, the ability to request that a location-indicating transmission be activated in a target, information reception from multiple potential targets, the display of targets in effective reception range of the seeking device, the display of the target location and other information related to targets in effective reception range of the seeking device, the display of relative direction towards a selected target device and the display of the current position of the seeking device.

In a first example of the present invention, the relative direction towards a target within effective wireless transmission range of a WCD is determined. An antenna array composed of multiple antennas in a known configuration is combined with (or within) the WCD to receive position-indicating transmission signals. These transmission signals are measured, and the measurements are used to perform a Direction of Arrival (DoA) calculation, which resolves the relative direction towards the target. The direction towards the target is then displayed to a user on the WCD.

The user may know the identity of the target. In this case, the user may indicate a target identification via a variety of well-known input methods. In some cases, the position-indicating transmission may need to be activated in the target. This depends on the type of position-indicating transmission device. Some targets will allow a user to activate the location beacon (position-indicating transmission) remotely via a wireless message to the target. Other location beacons will only allow remote activation through permission by the owner or controller of the target. A third class of targets are always active, and therefore, do not require remote activation.

The encountered targets in effective transmission range of the WCD may be displayed for the user. The user may select any of the displayed targets for direction determination, and possibly to view additional information about the target. The WCD may then use the previously indicated signal processing method to determine the relative direction towards the target device. The WCD may also, in some cases, use the location of various targets to triangulate the current location of the WCD.

In addition, exemplary applications of the present invention are presented. In at least one situation, the present invention may help to determine the relative location of targets, or position markers, within a building structure. The position markers may indicate locations of interest, and information relevant to these locations. The targets and locations of interest may include for example shops inside a shopping mall or products in a supermarket. The WCD may also use information provided from various position markers to provide an estimation of current location within the building structure.

The present invention also has application to outdoor direction and location finding. The present invention may be employed to list various locations or targets in an outdoor setting, allowing a user to view information pertaining to each target. The user may then choose one of the targets to locate, and the WCD will indicate relative direction to the target from the user's current location. Further, the WCD may use positional information provided from various target devices to provide an estimation of current location on a global (e.g., latitude and longitude) or regional basis (e.g., via map coordinates, address information, street names, etc.).

DESCRIPTION OF DRAWINGS

The invention will be further understood from the following detailed description of a preferred embodiment, taken in conjunction with appended drawings, in which:

FIG. 7 discloses exemplary antenna arrangements and an alternative structural description for receiving a position-indicating transmission in accordance with at least one embodiment of the present invention.

DESCRIPTION OF PREFERRED EMBODIMENT

While the invention has been described in preferred embodiments, various changes can be made therein without departing from the spirit and scope of the invention, as described in the appended claims.

I. Wireless Communication Over Different Communication Networks.

Figure 1:
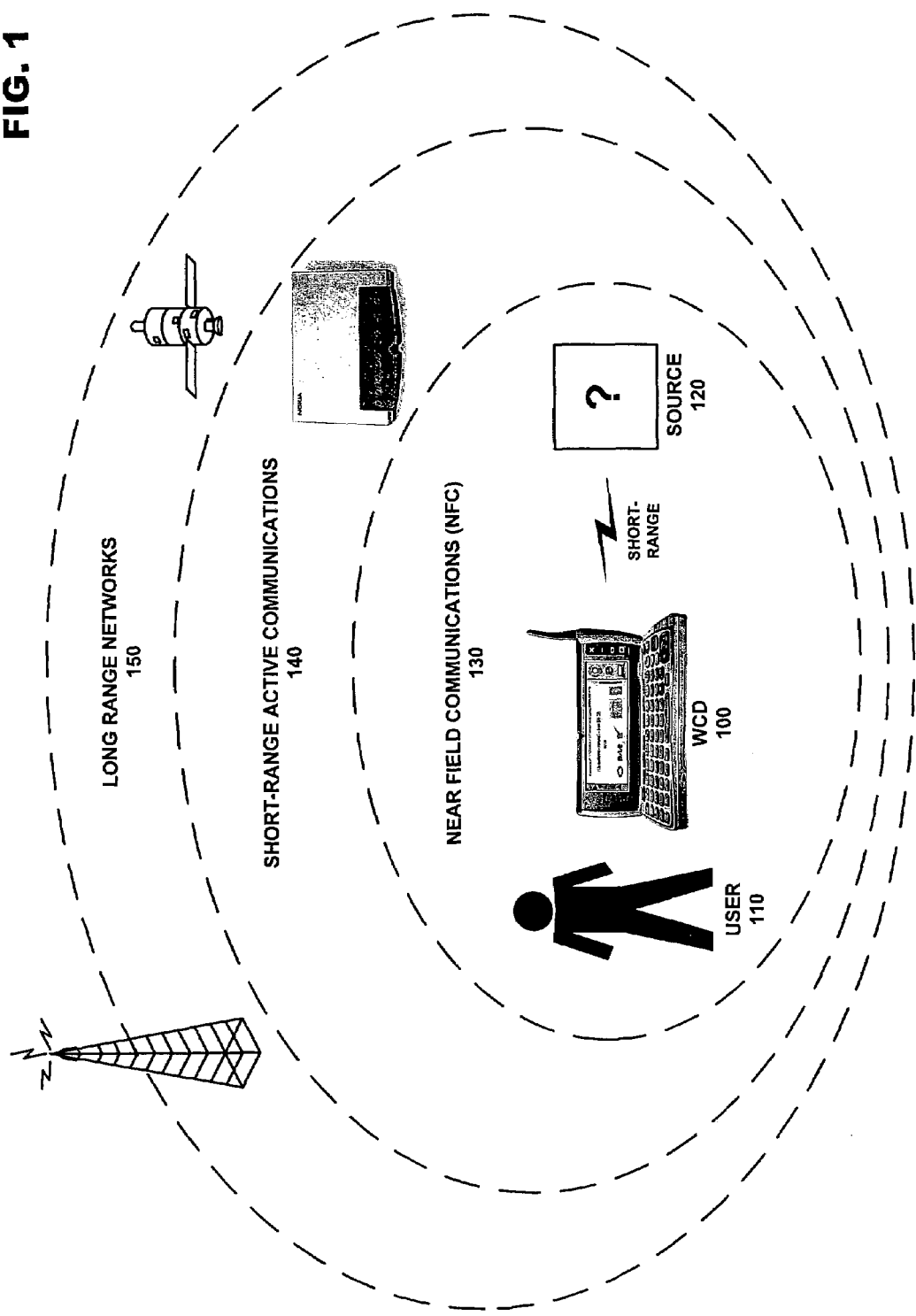
FIG. 1 discloses an exemplary short-range to long-range wireless communication environment usable to describe at least one embodiment of the present invention.

A WCD may both transmit and receive information over a wide array of wireless communication networks, each with different advantages regarding speed, range, quality (error correction), security (encoding), etc. These characteristics will dictate the amount of information that may be transferred to a receiving device, and the duration of the information transfer. FIG. 1 includes a diagram of a WCD and how it interacts with various types of wireless networks.

In the example pictured in FIG. 1, user 110 possesses WCD 100. This device may be anything from a basic cellular handset to a more complex device such as a wirelessly enabled palmtop or laptop computer. Near Field Communications (NFC) 130 include various transponder-type interactions wherein normally only the scanning device requires its own power source. WCD 100 scans source 120 via short-range communications. A transponder in source 120 may use the energy and/or clock signal contained within the scanning signal, as in the case of RFID communication, to respond with data stored in the transponder. These types of technologies usually have an effective transmission range on the order of ten feet, and may be able to deliver stored data in amounts from 96 bits to over a megabit (or 125 Kbytes) relatively quickly. These features make such technologies well suited for identification purposes, such as to receive an account number for a public transportation provider, a key code for an automatic electronic door lock, an account number for a credit or debit transaction, etc.

The transmission range between two devices may be extended if both devices are capable of performing powered communications. Short-range active communications 140 includes applications wherein the sending and receiving devices are both active. An exemplary situation would include user 110 coming within effective transmission range of a Bluetooth™, WLAN, UWB, WUSB, etc. access point. In the case of Bluetooth Low End Extension (BTLEE)/BluLite, a network may automatically be established to transmit information to WCD 100 possessed by user 110. BTLEE/BluLite may be used for battery-powered access points, since its power consumption is low. A BTLEE access point may use the advertisement mode to more rapidly establish the initial connection to WCD 100. This data may include information of an informative, educational or entertaining nature. The amount of information to be conveyed is unlimited, except that it must all be transferred in the time when user 110 is within effective transmission range of the access point. This duration is extremely limited if the user is, for example, strolling through a shopping mall or walking down a street. Due to the higher complexity of these wireless networks, additional time is also required to establish the initial connection to WCD 100, which may be increased if there are many devices queued for service in the area proximate to the access point. The effective transmission range of these networks depends on the technology, and may be from some 30 ft. to over 300 ft. with additional power boosting.

Long-range networks 150 are used to provide virtually uninterrupted communication coverage for WCD 100. Land-based radio stations or satellites are used to relay various communications transactions worldwide. While these systems are extremely functional, the use of these systems is often charged on a per-minute basis to user 110, not including additional charges for data transfer (e.g., wireless Internet access). Further, the regulations covering these systems cause additional overhead for both the users and providers, making the use of these systems more cumbersome.

II. Wireless Communication Device

As previously described, the present invention may be implemented using a variety of wireless communication equipment. Therefore, it is important to understand the communication tools available to user 110 before exploring the present invention. For example, in the case of a cellular telephone or other handheld wireless devices, the integrated data handling capabilities of the device play an important role in facilitating transactions between the transmitting and receiving devices.

Figure 2:
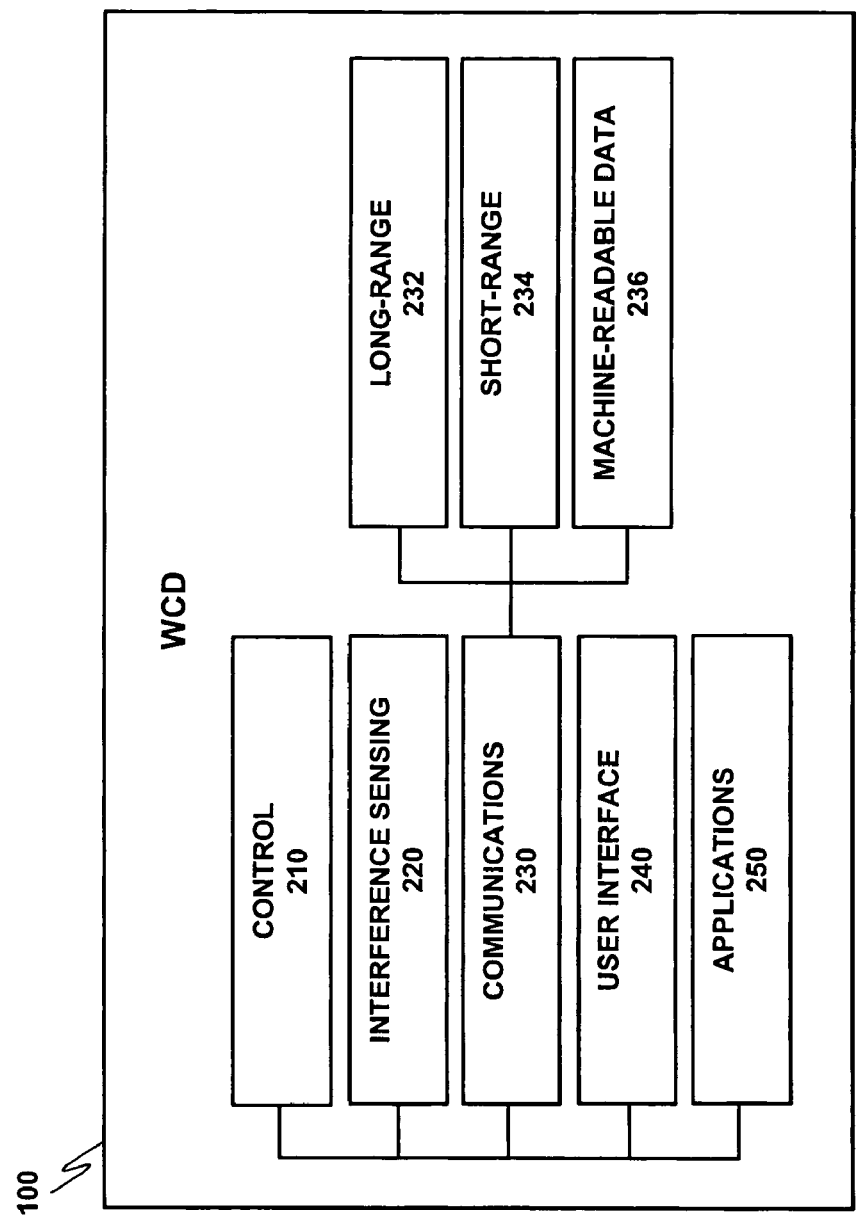
FIG. 2 discloses a modular description of an exemplary wireless communication device usable with at least one embodiment of the present invention.

FIG. 2 discloses an exemplary modular layout for a wireless communication device usable with the present invention. WCD 100 is broken down into modules representing the functional aspects of the device. These functions may be performed by the various combinations of software and/or hardware components discussed below.

Control module 210 regulates the operation of the device. Inputs may be received from various other modules included within WCD 100. For example, interference sensing module 220 may use various techniques known in the art to sense sources of environmental interference within the effective transmission range of the wireless communication device. Control module 210 interprets these data inputs, and in response, may issue control commands to the other modules in WCD 100.

Communications module 230 incorporates all of the communications aspects of WCD 100. As shown in FIG. 2, communications module 230 may include, for example, long-range communications module 232, short-range communications module 234 and machine-readable data module 236 (e.g., for NFC). Communications module 230 utilizes at least these sub-modules to receive a multitude of different types of communication from both local and long distance sources, and to transmit data to recipient devices within the transmission range of WCD 100. Communications module 230 may be triggered by control module 210, or by control resources local to the module responding to sensed messages, environmental influences and/or other devices in proximity to WCD 100.

User interface module 240 includes visual, audible and tactile elements which allow the user 110 to receive data from, and enter data into, the device. The data entered by user 110 may be interpreted by control module 210 to affect the behavior of WCD 100. User-inputted data may also be transmitted by communications module 230 to other devices within effective transmission range. Other devices in transmission range may also send information to WCD 100 via communications module 230, and control module 210 may cause this information to be transferred to user interface module 200 for presentment to the user.

Applications module 250 incorporates all other hardware and/or software applications on WCD 100. These applications may include sensors, interfaces, utilities, interpreters, data applications, etc., and may be invoked by control module 210 to read information provided by the various modules and in turn supply information to requesting modules in WCD 100.

Figure 3:
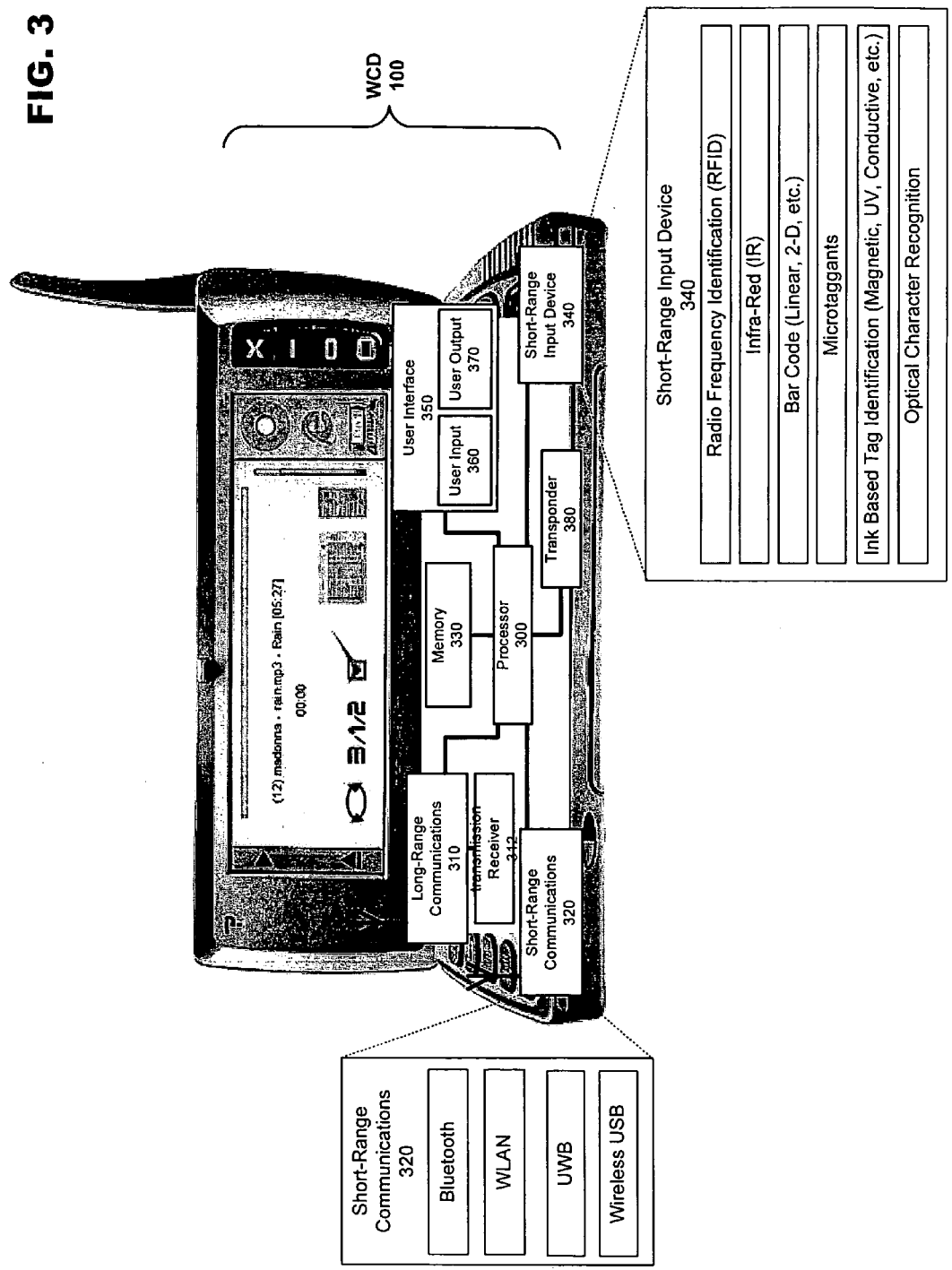
FIG. 3 discloses an exemplary structural description of the wireless communication device previously described in FIG. 2.

FIG. 3 discloses an exemplary structural layout of WCD 100 according to an embodiment of the present invention that may be used to implement the functionality of the modular system previously described in FIG. 2. Processor 300 controls overall device operation. As shown in FIG. 3, processor 300 is coupled to communications sections 310, 320 and 340. Processor 300 may be implemented with one or more microprocessors that are each capable of executing software instructions stored in memory 330.

Memory 330 may include random access memory (RAM), read only memory (ROM), and/or flash memory, and stores information in the form of data and software components (also referred to herein as modules). The data stored by memory 330 may be associated with particular software components. In addition, this data may be associated with databases, such as a bookmark database or a business database for scheduling, email, etc.

The software components stored by memory 330 include instructions that can be executed by processor 300. Various types of software components may be stored in memory 330. For instance, memory 330 may store software components that control the operation of communication sections 310, 320 and 340. Memory 330 may also store software components including a firewall, a service guide manager, a bookmark database, user interface manager, and any communications utilities modules required to support WCD 100.

Long-range communications 310 performs functions related to the exchange of information over large geographic areas (such as cellular networks) via an antenna. These communication methods include technologies from the previously described 1G to 3G. In addition to basic voice communications (e.g., via GSM), long-range communications 310 may operate to establish data communications sessions, such as General Packet Radio Service (GPRS) sessions and/or Universal Mobile Telecommunications System (UMTS) sessions. Also, long-range communications 310 may operate to transmit and receive messages, such as short messaging service (SMS) messages and/or multimedia messaging service (MMS) messages.

As a subset of long-range communications 310, or alternatively operating as an independent module separately connected to processor 300 (not pictured), transmission receiver 312 allows WCD 100 to receive transmission messages via mediums such as Digital Video Broadcast for Handheld Devices (DVB-H). These transmissions may be encoded so that only certain designated receiving devices may access the transmission content, and may contain text, audio or video information. In at least one example, WCD 100 may receive these transmissions and use information contained within the transmission signal to determine if the device is permitted to view the received content.

Short-range communications 320 is responsible for functions involving the exchange of information across short-range wireless networks. As described above and depicted in FIG. 3, examples of such short-range communications 320 are not limited to Bluetooth™, WLAN, UWB and Wireless USB connections. Accordingly, short-range communications 320 performs functions related to the establishment of short-range connections, as well as processing related to the transmission and reception of information via such connections.

Short-range input device 340, also depicted in FIG. 3, may provide functionality related to the short-range scanning of machine-readable data (e.g., for NFC). For example, processor 300 may control short-range input device 340 to generate RF signals for activating an RFID transponder, and may in turn control the reception of signals from an RFID transponder. Other short-range scanning methods for reading machine-readable data that may be supported by the short-range input device 340 are not limited to IR communications, linear and 2-D (e.g., QR) bar code readers (including processes related to interpreting UPC labels), and optical character recognition devices for reading magnetic, UV, conductive or other types of coded data that may be provided in a tag using suitable ink. In order for the short-range input device 340 to scan the aforementioned types of machine-readable data, the input device may include optical detectors, magnetic detectors, CCDs or other sensors known in the art for interpreting machine-readable information.

As further shown in FIG. 3, user interface 350 is also coupled to processor 300. User interface 350 facilitates the exchange of information with a user. FIG. 3 shows that user interface 350 includes a user input 360 and a user output 370. User input 360 may include one or more components that allow a user to input information. Examples of such components include keypads, touch screens, and microphones. User output 370 allows a user to receive information from the device. Thus, user output portion 370 may include various components, such as a display, light emitting diodes (LED), tactile emitters and one or more audio speakers. Exemplary displays include liquid crystal displays (LCDs), and other video displays.

WCD 100 may also include one or more transponders 380. This is essentially a passive device which may be programmed by processor 300 with information to be delivered in response to a scan from an outside source. For example, an RFID scanner mounted in a entryway may continuously emit radio frequency waves. When a person with a device containing transponder 380 walks through the door, the transponder is energized and may respond with information identifying the device, the person, etc. Alternatively, the scanner may be mounted in the WCD so that it can read information from transponders in the vicinity.

Hardware corresponding to communications sections 310, 312, 320 and 340 provide for the transmission and reception of signals. Accordingly, these portions may include components (e.g., electronics) that perform functions, such as modulation, demodulation, amplification, and filtering. These portions may be locally controlled, or controlled by processor 300 in accordance with software communications components stored in memory 330.

The elements shown in FIG. 3 may be constituted and coupled according to various techniques in order to produce the functionality described in FIG. 2. One such technique involves coupling separate hardware components corresponding to processor 300, communications sections 310, 312 and 320, memory 330, short-range input device 340, user interface 350, transponder 380, etc. through one or more bus interfaces. Alternatively, any and/or all of the individual components may be replaced by an integrated circuit in the form of a programmable logic device, gate array, ASIC, multi-chip module, etc. programmed to replicate the functions of the stand-alone devices. In addition, each of these components is coupled to a power source, such as a removable and/or rechargeable battery (not shown).

The user interface 350 may interact with a communications utilities software component, also contained in memory 330, which provides for the establishment of service sessions using long-range communications 310 and/or short-range communications 320. The communications utilities component may include various routines that allow the reception of services from remote devices according to mediums such as the Wireless Application Medium (WAP), Hypertext Markup Language (HTML) variants like Compact HTML (CHTML), etc.

III. Current Systems for Providing Location-Finding or Directional Information.

Figure 4:
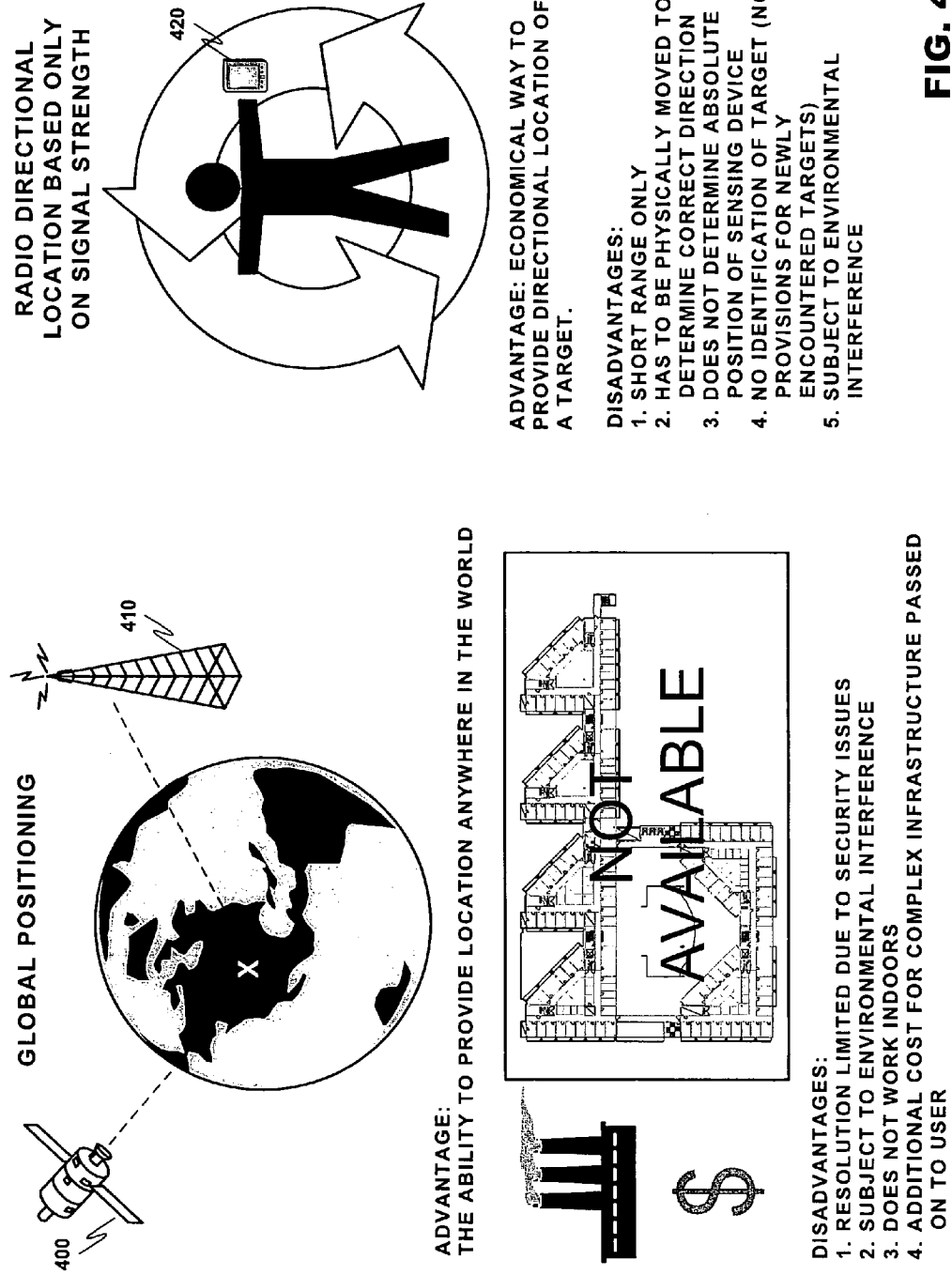
FIG. 4 discloses exemplary forms of location-finding and directional systems currently employed to determine direction and/or location.

There are some location-finding or direction-finding systems on the market today. In FIG. 4, two examples are disclosed which may represent two extremes in this technology area. These two technologies have been implemented to serve very different purposes, and as such, have different strengths and weaknesses.

Global positioning systems may deliver a precise geographic location (e.g., latitude and longitude measurement) to a user. Traditionally, these systems have been mounted in vehicles, but now smaller compact versions are available that may be carried with a pedestrian. These systems use satellites 400 or terrestrial radio networks 410 to determine the location of a receiver in global coordinates, such as longitude and latitude. The obvious advantage of these systems is their ability to determine the absolute location of a GPS device. Most commercial devices may figure the correct position of a person within a few meters.

However, while these systems deliver global location information, there are some limitations to this technology. GPS is only usable outside due to the need to receive a signal from satellite 400. Network assisted GPS (AGPS) systems also have limited indoor coverage, but the performance is typically not adequate. Precision can be intentionally limited by government regulation due to security concerns regarding how a location device may be maliciously used if too accurate. GPS positioning signals are also subject to multipath (reflection) or environmental interference, especially in dense urban environments, which tends to cause location determining errors. In order to correct this problem, differential systems may be employed combining both satellite 400 and ground based systems 410, however, these systems are more costly to operate, the additional cost of which may be passed on to the consumers. Further, the software required to implement GPS directional systems may be complex, requiring substantial hardware support in order to function properly.

On the other end of the spectrum is single antenna radio location based only on signal strength. Tracking device 420 may be tuned to the frequency of one or more known signal emitters. In the simplest implementation an omnidirectional antenna is used to find any targets in the vicinity by receiving their signals, in order to indicate their presence and possibly the location of the tracking device. To improve the accuracy, a unidirectional antenna on tracking device 420 may be used to measure the strength of each received signal, wherein the reception strength is indicated using a visual or audio method. The user physically moves the device in a sweeping pattern and monitors the signal strength indicator. The direction of strongest signal reception is deemed to be the direction towards the target. RadarGolf™ is an example of this type of devices. Also more sophisticated direction and distance tracking devices exist, such as Bluespan® Ion-Kids®, which are based on proprietary technology.

While this type of system is very economical to operate, it only has limited applications. Tracking device 420 may locate only known objects over relatively short range. The user of the device must physically sweep the device back and forth in order to determine the target direction. There is no way to determine the absolute position of the target or tracking device 420 (e.g., there is no way to estimate longitude and latitude of either tracker or target). In addition, depending on the technology employed, tracking device 420 is subject to electromagnetic and environmental interference, and would not be effective where this type of interference abounds, for example, in a building.

III. A Multiple Antenna Direction of Arrival Tracking System.

At least one embodiment of the present invention employs signals received on multiple antennas in a Direction of Arrival ("DoA") signal processing scheme in order to determine a relative direction to a target from WCD 100. In this technique, the direction of arrival of the incident signal (e.g., the position-indicating transmission) is resolved based on the phase and possibly amplitude differences of signals received by the elements of an antenna array. In the simplest method, historically known as the Bartlett Beamformer, the normalized received power in each array look direction ($\theta$) is calculated using the following relationship:

$$P(\theta) = \frac{a^H(\theta)Ra(\theta)}{L^2} \quad (1)$$

Wherein in equation (1), $a(\theta)$ is a so called steering vector of the array and R is the spatial covariance matrix of the received signal. L is the number of elements in the antenna array. $a^H$ denotes a conjugate transpose of the matrix a. The direction giving the highest power is then assumed to be the direction of the target.

The covariance matrix R is obtained as:

$$R = E\{x(t)x^H(t)\} \quad (2)$$

where x(t) is the vector of signals received from the antenna elements as a function of time t.

The elements of the steering vector $a(\theta)$ are the output signals of the array elements, when it receives a plane wave from direction $\theta$. It is defined as:

$$a_n(\theta) = g_n(\theta) \cdot e^{-jk r_n \cdot u_r(\theta)} \quad (3)$$

in which $g_n(\theta)$ is the complex radiation pattern of element n, k is the wave number (defined as $2\pi/\lambda$ where $\lambda$ is the wavelength at center frequency), $r_n$ is the location vector of element n, and $u_r$ is the radial vector towards the incident wave direction $\theta$. In a simple case of a linear array of identical and equally spaced elements the steering vector simplifies to:

$$a(\theta) = g(\theta)[1 e^{-jkd\cos\theta} \dots e^{-j(L-1)kd\cos\theta}]^T \quad (4)$$

in which d is the inter-element spacing of linear, equally spaced antenna elements in the array. $\theta$ is the angle between the line connecting the linearly located antenna elements and the incident wave direction.

In a small handheld device the radiation patterns of the elements are typically not identical because they are affected by the metallic chassis of the device. The elements may also be differently oriented due to space limitations in the device. In this case, either Eq. (3) must be used, or the steering vector can also be directly measured in a calibration measurement, or it can be computed using electromagnetic simulation tools.

The DoA estimation accuracy decreases in the presence of multipath propagation or noise. In the noisy multipath radio propagation channel the accuracy can be increased by improving the resolution of the array through increasing its size by adding more antenna elements. In addition, the distance between any two antenna elements in the array should not exceed half a wavelength to obtain unambiguous DoA estimate.

Multipath radio propagation causes fading that can lead to rapid changes of the DoA estimates and temporary mispointings. To overcome the problem one aspect of the invention uses a tracking algorithm. It is based on keeping a register of several DoA estimates and choosing the one with highest average power to be selected as the actual output.

The DoA estimation algorithm calculates an azimuth power spectrum, i.e. the signal power received from azimuth directions. The tracking algorithm extracts the maxima from the azimuth power spectrum. It keeps track of e.g. the 5 strongest directions. If one of the newly extracted maxima is close (e.g. within 10 degrees) to one of these directions, then the signal power and the direction is added to the tracked direction. If not, the new direction is tracked. All the signal power values of the tracked directions are filtered using a forgetting curve and the DoA of each tracked direction is calculated using a weighted average of the extracted directions for this tracker. After each tracker update, tracked directions that are closer than e.g. 10 degrees are merged and the number of tracked directions is reduced to the five strongest directions.

Without using this tracking algorithm, the strongest maximum would be chosen to be the DoA, which might lead to rapid changes in the estimated DoA due to fading.

Figure 5:
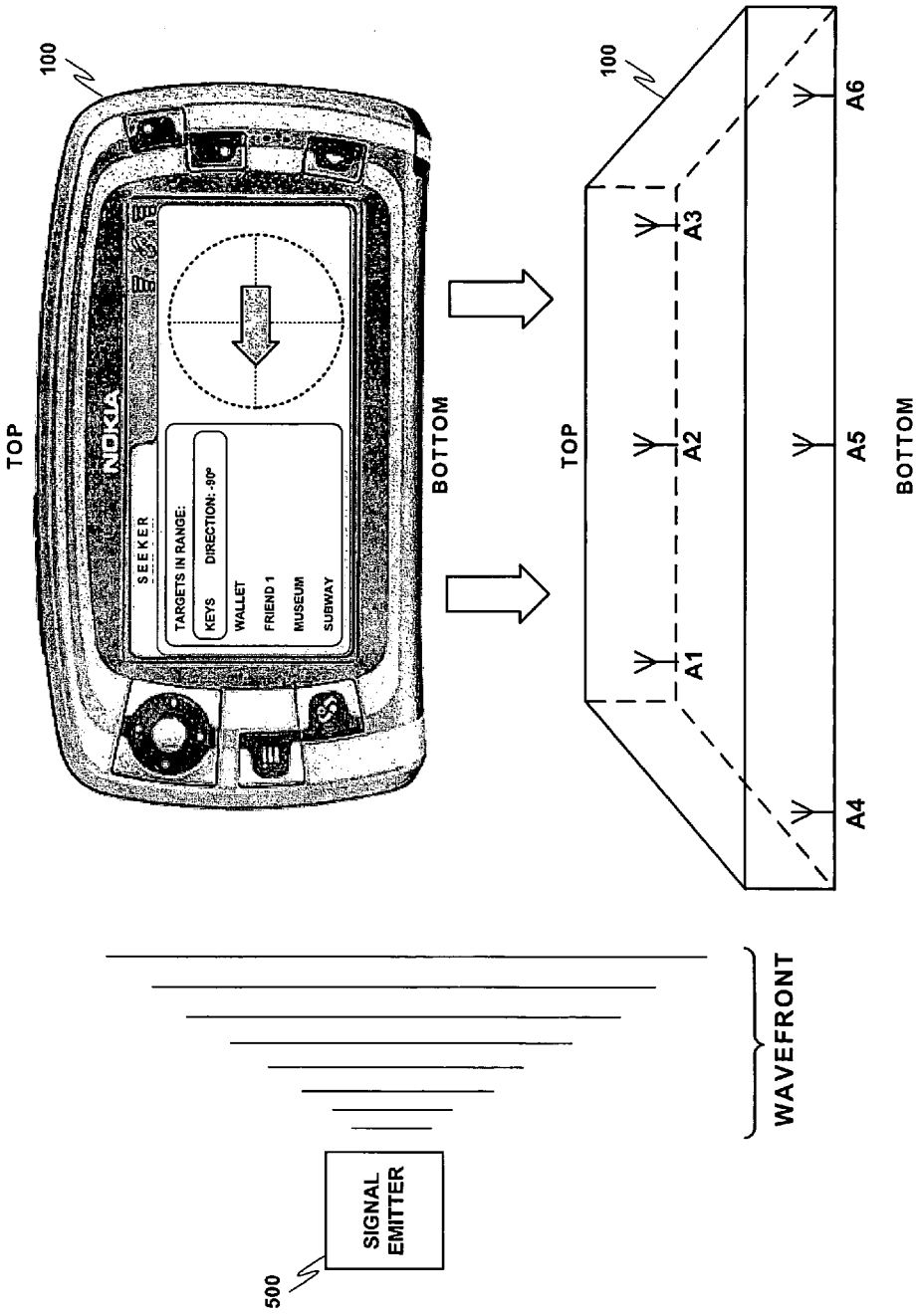
FIG. 5 discloses an exemplary wireless communication device including integrated direction-finding features in the form of an antenna array in accordance with at least one embodiment of the present invention.

FIG. 5 discloses an exemplary WCD 100 configuration usable with the present invention. In addition to the elements and features already disclosed in FIGS. 2 and 3, the present invention may also include an antenna array. A simplified three-dimensional transparent view of WCD 100 is shown below the exemplary exterior picture of the device 100. The transparent three-dimensional view includes antennas A1-A6. The number of antennas doesn't have to be six, but it can be any number larger than one. The placement of antennas A1-A6 may be within the outer housing of WCD 100 to form an array such as the one shown. The array may provide directional field sensing that is interpreted into a direction for display on WCD 100. Signal emitter 500 may emit a position-indicating transmission that is receivable via the antenna array. The placement and orientation of these antennas may allow a user to hold WCD 100 in an horizontal orientation, wherein the display faces upward towards the sky. As will be seen, this orientation lends more naturally to a pointer display indicating direction, such as in the use of a traditional compass when orienteering.

In another example (not shown) the antenna array and/or support circuitry may be housed within an outside component that may be removably attached to WCD 100. This exterior component or attachment may be connected when user 110 wants to determine direction or location, and its connection may automatically signal WCD 100 to enter a position or direction finding mode. It is important to note that if the antenna array is housed in an attachable exterior unit, that the orientation of the exterior unit with respect to WCD 100 would be a fixed, predetermined orientation with respect to the housing of WCD 100 in order to establish a known orientation for the antenna array. In this way, the antenna array will always be in the same (or a known) configuration when attached to WCD 100.

FIG. 5 also includes an example display shown on WCD 100 that is viewable by user 110. This display may be implemented in different configurations depending upon the application to which it is applied. In this example, the display shows both a list of possible target objects and an arrow pointer. There can be one or multiple active signal emitters 500 within one area at the same time. Multiple beacons can share the same communications medium by using a multiple access method (code, frequency or time). The "KEYS" target object is currently selected. This object is also represented in FIG. 5 as by signal emitter 500, which may be included as a keychain connected to a set of keys. Since the keys object is selected, the WCD 100 will attempt to define the relative direction towards the target designated as keys. The display shows the directional arrow pointing in the direction of the keys, and gives a relative direction measurement towards the keys of −90°. As the user moves toward the selected target, WCD 100 will continuously measure the signal of the target device and will update the display accordingly so that the arrow and the directional measurement continue to indicate the relative direction toward the keys.

Figure 6:
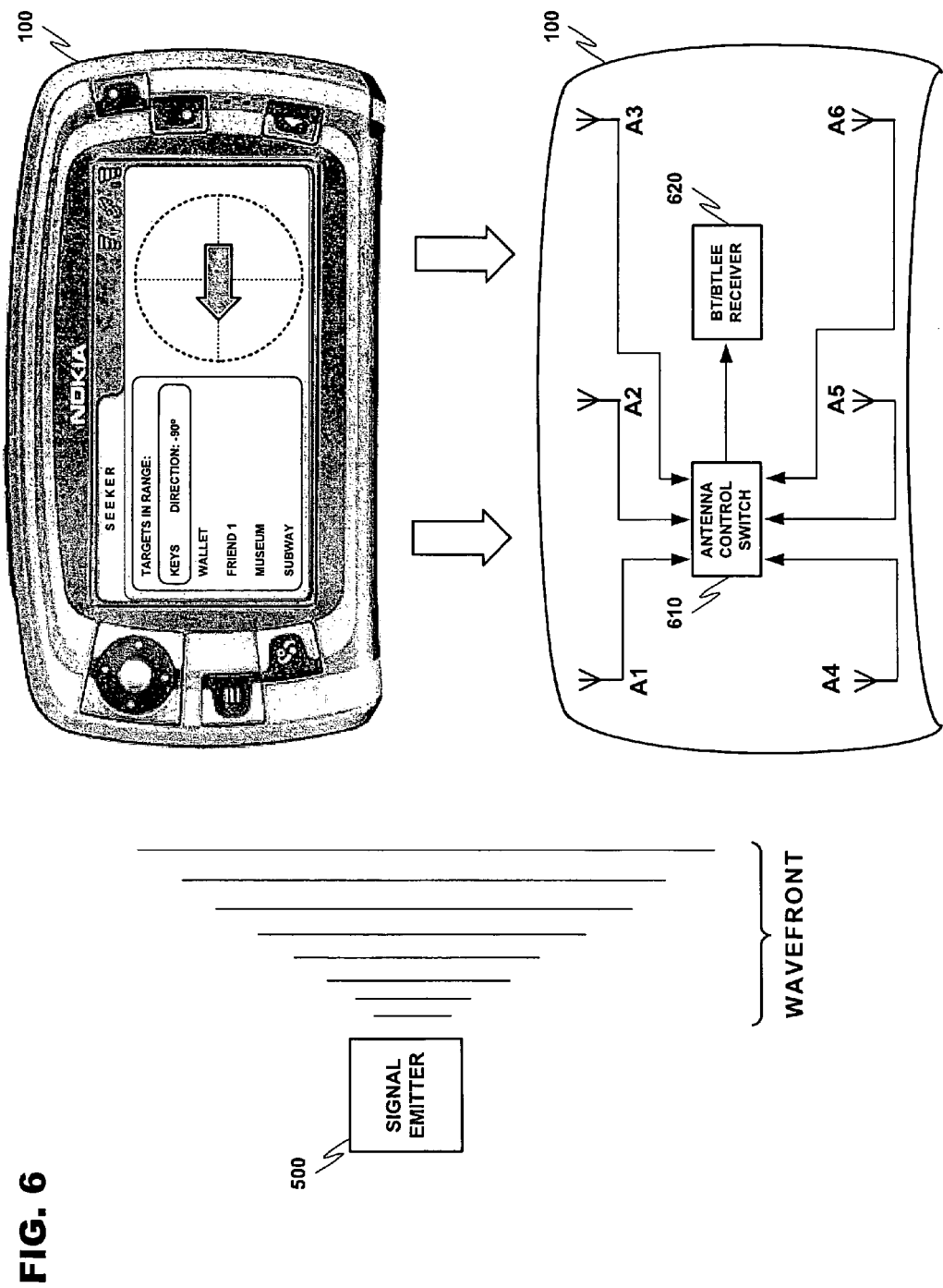
FIG. 6 discloses an exemplary structural description for direction-finding features usable for receiving a position-indicating transmission in accordance with at least one embodiment of the present invention.

FIG. 6 includes a structural diagram of WCD 100. Again, WCD 100 includes any and or all of the elements and features previously disclosed in FIGS. 2 and 3. In FIG. 6, additional elements and features are included that may be composed of stand-alone devices, or may be emulated by combinations of hardware and software present in WCD 100. Antennas A1-A6 may be coupled to antenna control switch 610. Control switch 610 multiplexes the antennas so that one receiver 620 may monitor incoming transmissions from all of the antennas. Signals received on antennas A1-A6 determine the relative direction to a target from WCD 100. The direction of arrival of the incident signal (e.g., the position-indicating transmission) is resolved based on the phase and possibly amplitude differences of the signals received by the respective antennas A1-A6. Control switch 610 sequentially feeds the signal from each antenna to the receiver 620, where the Direction of Arrival ("DoA") signal processing operates on the signal phase and possibly amplitude information to determine a relative direction to a target from WCD 100. This information is fed to receiver 620. Depending on the technology used in the switch, for example GaAs FETs vs. PIN diodes, the switch may operate at different speeds. Given present technology, it appears that a 10 µs scan time for all antennas is conceivable. Fast switching time is beneficial because it allows DoA estimation from short transmissions and does not set high requirements for the stationarity of the radio channel.

In at least one embodiment of the present invention, receiver 620 is a Bluetooth™ or Bluetooth Low End Extension (BTLEE) receiver, also known as BluLite. BTLEE is an add-on extension to the Bluetooth™ command set composed especially for simple devices. This specialized command set allows low end devices to communicate wirelessly with a significantly lower power requirement. BTLEE may be implemented in chip form to make Bluetooth™ implementation in low end devices more economical. The use of BTLEE may be more appropriate for the location of personal items. A BTLEE chipset may be incorporated into a keychain or into the lining of a wallet or garment to allow locating via wireless communication, as will be explained below. BT/BTLEE receiver 620 receives signals multiplexed from Antennas A1-A6 and uses this information to determine relative direction using DoA signal processing as previously described. The receiver may also, in some cases, receive information contained within the position-indicating transmission. In these cases the determination of direction and the reception of information carried within the signal may be delayed as the primary receiver 620 attempts to multitask both information reception and DoA determination. This situation may be cured by the further example disclosed in FIG. 7.

The example structural configuration of FIG. 7 separates the responsibility of determining DoA determination and BTLEE reception into two separate receiving modules. Antenna A1 is directly tied to BTLEE receiver 720 so that information may be received real-time from the position-indication transmission for immediate decoding. As will be discussed later, this information may include identification information announcing that the device is a possible target, identification of the target and other target related data. Dedicated DoA receiver 730 may then be free to concentrate on deriving the time and spacing relationship between the reception of the position-indicating transmission at the various antennas in the antenna array, which is used to determine the relative direction of the object from WCD 100. The information received by both devices may be synchronized, for example, by control and DoA timing information sent from BTLEE receiver 720 to DoA receiver 703. Further, both receiving devices may then forward information to central processor 300 which may combine, process, and format the information for display on WCD 100. Although FIG. 7 shows two receivers 720 and 730, alternate embodiments of the invention can have more than two receivers.

FIG. 7 also discloses two exemplary antenna configurations usable in at least one embodiment of the present invention. The antenna configurations 700 and 710 may be implemented to improve signal reception and directional indication in the device. The more appropriate antenna configuration will depend on a variety of factors including the size of the device, the composition (e.g., materials, layout, complexity, etc.) of the device, the antenna radiation characteristics required for each antenna, antenna spacing, etc.

IV. The Directional Signal.

Figure 8:
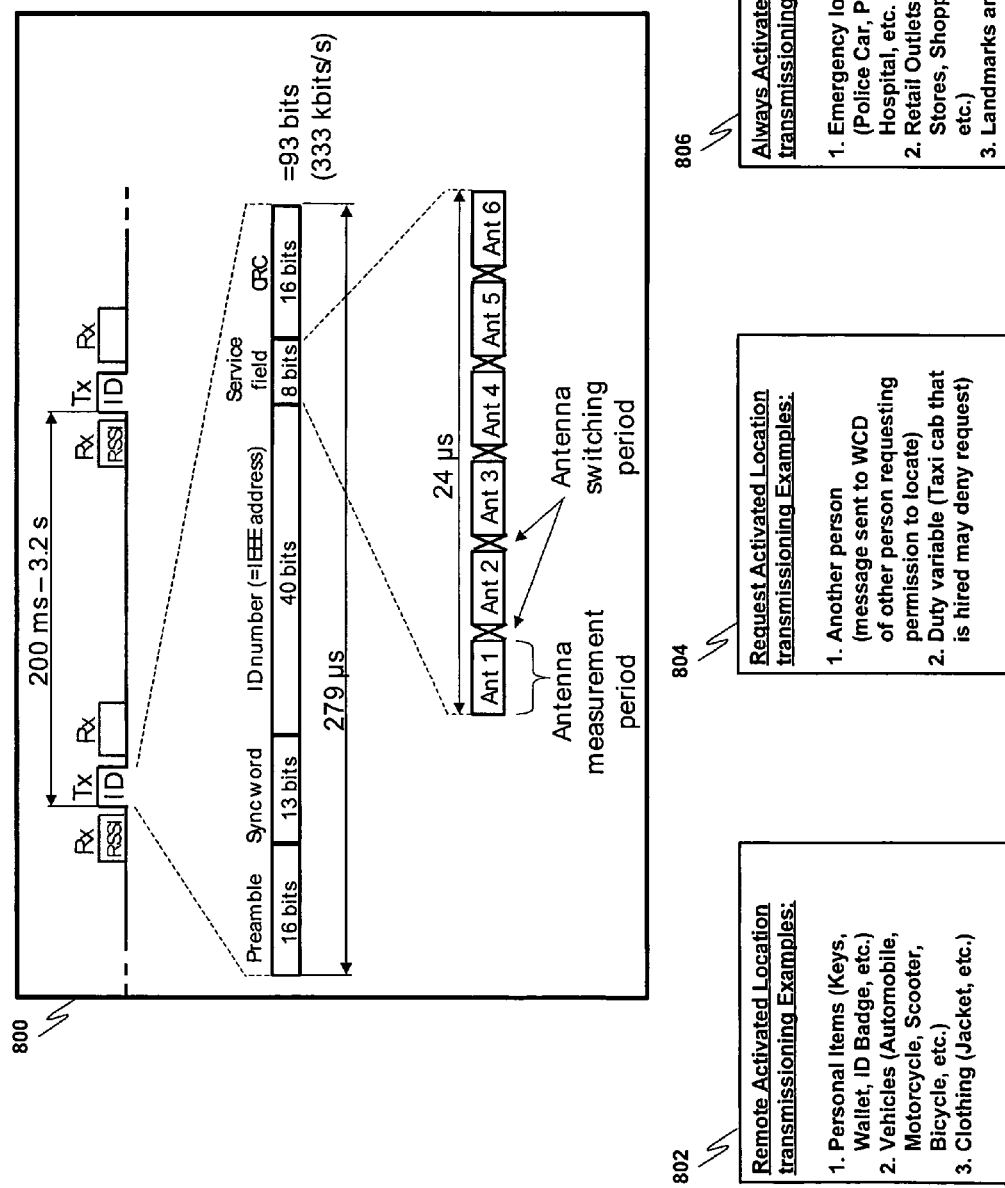
FIG. 8 discloses an exemplary position-indicating transmission and different transmission strategies in accordance with at least one embodiment of the present invention.

FIG. 8 discloses the makeup of an exemplary position-indicating transmission and different types of position indicating signals. Signal description 800 includes an example frame from a BTLEE/BluLite transmission. While BTLEE/BluLite is used for this example, any of the aforementioned communication mediums may also be applicable. Initially, the transmission must be identified as a position-indicating transmission. The 16 bit preamble may include a code (e.g., 1010101010101010) that is used to indicate the beginning of the packet and to synchronize the receiver. This indication allows WCD 100 to begin measurement so that when the 8 bit service field is transmission, one or both of the preamble and the service field may be measured by antennas A1-A6 in WCD 100. The transmission 800 may also include identification information for the position-indicating transmission device, or other device target related information as will be described below.

In addition, different types of position-indicating transmission strategies as disclosed in FIG. 8. Remotely activated location transmission 802 may be employed by a target whose signal emitter 500 may be limited by low power concerns. These devices, such as battery-operated transmitters in a keychain, in a wallet, embedded in an ID badge, mounted in a vehicle such as an automobile, motorcycle, scooter, bicycle or in a piece of clothing, may be activated remotely by a user as needed. For example, the device may operate in a lower power or power conservation mode until a message is received instructing a device to activate the position-indicating transmission signal. This message may be received by any of the aforementioned wireless mediums such as via a Bluetooth™ message. Alternatively, signal emitter 500 may include a transponder, activated by a scanning signal from WCD 100. This scanning signal may be, for example, a UHF RFID signal. This signal may activate a transponder in a 5-10 meter range, and the transponder may respond with a signal that can be used to determine the object's relative position, or may in turn trigger another subsystem in signal emitter 500 to transmit the position-indicating transmission.

In 804, the relative direction towards devices that require a request to activate may be determined. These are typically powered devices that are in the possession of another user. For example, User 110 may want to locate a friend that user 110 believes to be in the immediate area. User 110 may send a message to the friend's WCD requesting an activation of a position-indicating transmission. This message may occur via any of the long-range mediums (for example, via SMS) or any of the short-range mediums previously discussed. Depending on whether the friend is familiar with user 110, or for other security-related reasons, the friend may accept or deny the request to activate the position-indicating feature in their WCD. If the friend declines, a message is returned to WCD 100 that indicates the friend has refused the locating request. Alternatively, the friend may accept the request, activate their location beacon and WCD 100 may receive the position-indicating transmission. This feature may be utilized for commercial features as well. WCD 100 may indicate that there is a taxi cab in the immediate area. User 110 may send a message to the taxi requesting to hire the cab and position indication. If the taxi is already hired or on a break, the driver may refuse the request, or ignore it. On the other hand, if the driver is looking for a fare he may accept the request, the relative position of the taxi being displayed in WCD 100 with other relevant information such as fare information.

A third type of target includes an always active position-indicating transmission 806. These signal emitters may be expanded range externally powered devices, for example, Bluetooth™ access points. WCD 100 may display these position markers so that user 110 may locate desired services. For example, a police car may include an always active position-indicator so that pedestrians may find them in times of emergency. This same example may also apply to Hospital emergency rooms. In non-emergency situations, these always-on devices 806 may indicate wireless access points wherein a user may connect to the Internet via a short-range wireless connection. Landmarks, commuter transportation such as buses and trains, retail establishments (restaurants and stores) and entertainment venues may also utilize always-on position-indicating transmission emitters to advertise their services. More specific applications for the use of always-on devices 804 will be discussed below.

Figure 9:
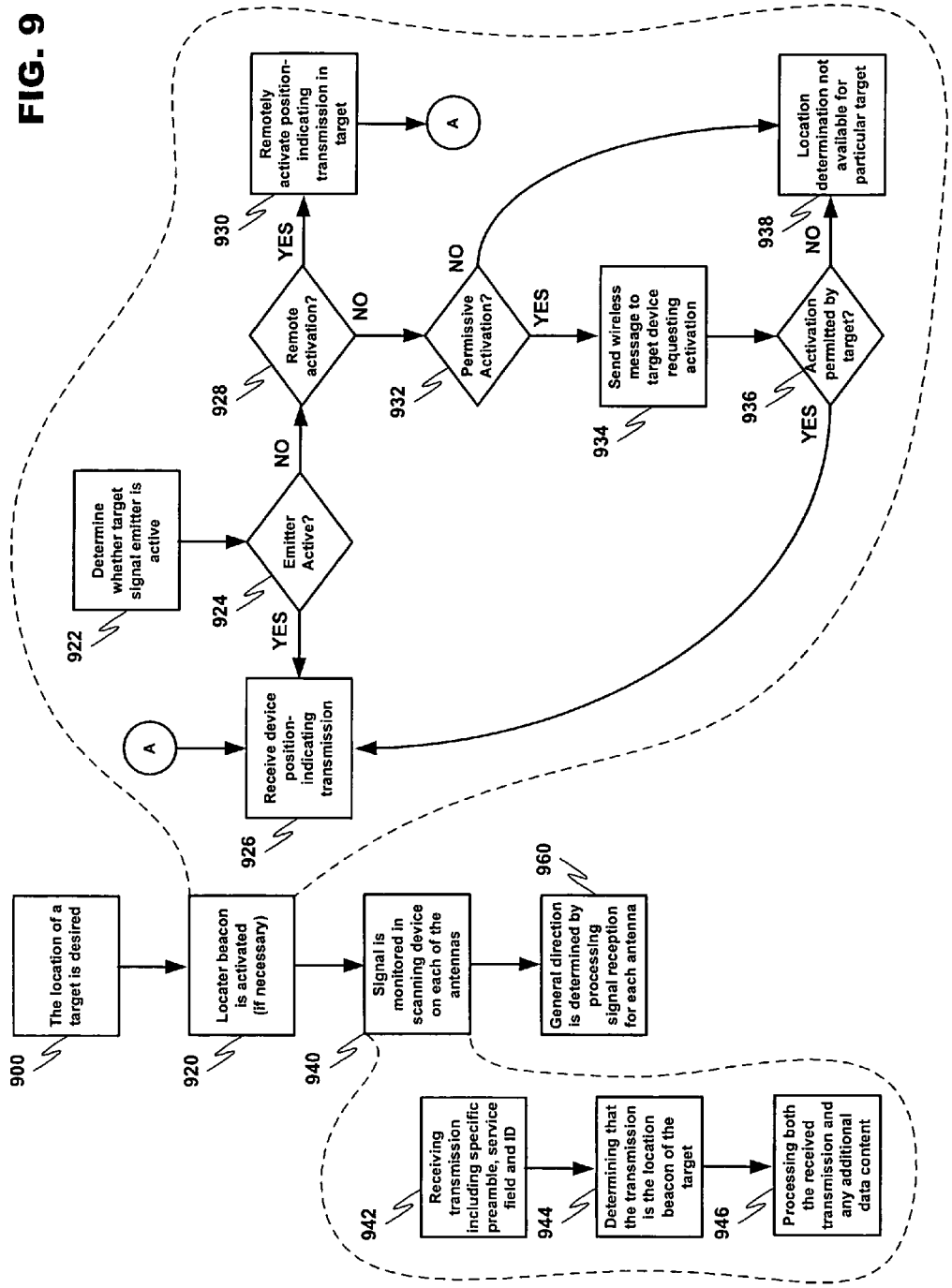
FIG. 9 discloses a process flowchart usable to operate at least one embodiment of the present invention.

FIG. 9 includes several flowcharts describing the process of operation for at least one embodiment of the present invention. In step 900, user 100 desires to find the location of a target. The user then activates a seeker application utilized to determine the relative direction towards a target. In step 920, potential targets are displayed, and the position-indicating transmission (locator beacon) of a desired target may be activated if necessary.

The determination of whether a locator signal requires activation in step 920 is detailed in steps 922-938. User 110 may first determine whether a position-indicating transmission from a desired target has been detected by WCD 100. This may entail user 110 viewing a list of potential targets discovered within effective transmission range of WCD 100. Effective transmission range may be dictated by the wireless medium in use. If the medium is, for example, Bluetooth™, the distance may be up to 100 meters. User 110 determines if the desired target is already active in step 924 by checking for its presence in the listing of target devices. If the device is active, then user 110 may select the device and WCD 100 may determine relative direction towards the device in step 926. Alternatively, in step 928 an inactive device is subject to further determination as to whether the target device is configured to allow remote activation of its position-indicating transmission system. If the target device is configured to allow remote activation, then in step 930 an activation message is sent to the target device via any of the aforementioned methods of wireless communication. Once WCD 100 recognizes the signal, the target should then appear in the displayed target listing. User 110 may then select the target and WCD 100 may determine relative direction towards the device in step 926. Even if the target does not permit remote activation, it may be possible for user 110 to request that the owner or controller of the target activate the locator beacon. In step 932 a determination is made as to whether the permissive activation of the target position-indicating transmission is available. If this feature is not available, then the location of the target may not be currently available (step 938). On the other hand, if this feature is available then a message is sent to the owner or controller of the target in step 934 requesting the starting of the position-indicating transmission. The owner may either accept or refuse the request, the acceptance manifesting in the activation of the locator beacon, and the appearance of the target in the listing displayed on WCD 100. User 110 may then select the device and WCD 100 may determine relative direction towards the target in step 926. If the request is refused, then the location of the target may not be currently available (step 938). Alternately, the request can be to change the transmitted signal properties (e.g. packet repetition rate) to improve the DoA determination possibilities. For example, a position marker can be in park mode where it's only transmitting one packet per second. After receiving the activation request, it starts transmitting packets more often to speed up the direction finding.

In step 940 the position-indicating transmission is received by WCD 100 on any of the antennas A1-A6. Steps 942-946 further describe this process. Initially, in step 942 a transmission is received including a preamble that WCD 100 may recognize as a position-indicating transmission. Additional information may be decoded from this signal including information identifying the transmitting target, information monitored to determine DoA (such as the 8 bit service field) and any other target relevant information (step 944). The received information is the processed (step 946), and both the content related information and the directional information may be used to provide information to user 110. Both the content related information including information of target identity and the directional information may be encrypted so that it is available only to authorized devices that have the means to decode it. The encryption is especially important in the case of always-on position-indicating transmission emitters.

In step 960 the processed information may be displayed for user 110. This information may indicate the name of the target and the relative direction towards the target from the current position of WCD 100. Further, the received information may include additional information relevant to the target. This information may be made available if user 110 selects the target from the listing displayed on WCD 100. The possible content of the additional information will be discussed below. Further, information received from the various potential target devices discovered in the effective transmission range of WCD 100 may be used to triangulate the approximate position of WCD 100 in absolute (e.g., latitude and longitude) or relative (e.g., 150 meters North from target) terms.

V. An Exemplary Application for Direction Determination within a Structure

The present invention has numerous practical applications. In at least one embodiment of the present invention, a system for determining both current position and relative direction to a target within a building structure is disclosed.

Figure 10:
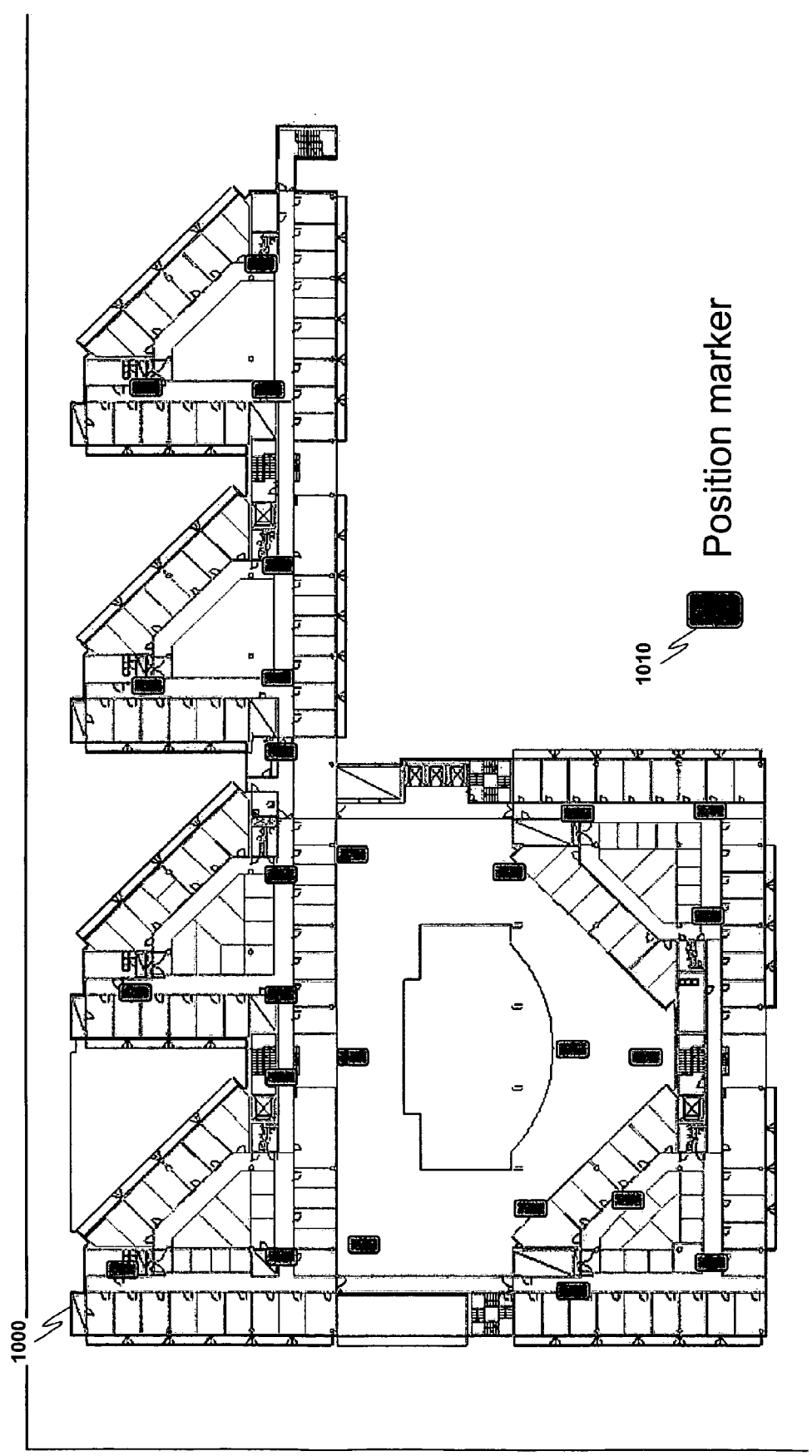
FIG. 10 discloses an exemplary application of the present invention wherein position markers are employed to mark locations in a building.

FIG. 10 includes a building floor plan 1000. This floor plan is exemplary of any building floor plan in a high rise office building, government facility, educational facility, etc. A guest to building 1000 may not be aware of the location of important landmarks within the building. For example, visitors within the building may not know where restrooms, meeting rooms, the main reception area, elevators, garages and most importantly emergency exits reside. Further, visitors may not know where certain contact people may be found. Presently a visitor must rely on a combination of signage and their memory to determine their way. However, in a large facility with many areas that look similar, this may still result in the guests or visitors becoming lost.

The present invention may aid to resolve this issue. A building may include various position markers 1010 that transmit position indicating information via short-range communication. Position marker 1010 may use any of the previously indicated short range communication technologies in order to both transmission its identity and provide for DoA determination of relative direction and/or position. For example, user 110 may be a visitor in a large commercial complex. User 110 may know some relevant information like the name of the conference room where a meeting is being held, the name of the person with whom user 110 is scheduled to meet, etc. Initially, user 110 may activate a seeker application on WCD 100 to aid in the determination of available targets (position markers 1010) in building 1000. In some cases, the presence of WCD 100 inside the building may prompt the seeker program to wirelessly download a schematic of the building. This information may be available via a wireless access point using a communication medium like Bluetooth™, WLAN, GPRS, etc. The seeker program may use this building schematic in the direction and position location of various selected targets. Otherwise, the seeker application may simply indicate the correct direction to follow, such as with the pointer arrow display previously described. To prevent unauthorized access to location or service related information e.g. for security or business reasons, the information transmitted by the position markers 1010 may be encrypted so that only such WCDs 100 that have the required key are able to access the information.

If user 110 initially selects "restrooms", WCD 100 may indicate the relative direction to the closest restroom. Afterwards, user 110 may select the conference room or the individual with whom they are to meet to determine the relative direction to that individual. Further, selecting the target may give additional information about that particular target. For example, in the case of the conference room as a target, WCD 100 may obtain additional information on the floor location of a conference room, the name of the employee currently reserving the conference room, the schedule of use for the conference room, the maximum occupancy of the conference room, the presentation equipment available in the conference room, etc. In the case of an individual, the person may have a signal emitter 500 installed at their desk and/or have a low-power signal emitter on their person (e.g., embedded in an identification badge). Information related to a person may include, the person's name, position, office location and possibly a message for anyone who is looking for the person (e.g., "I am sick today," "I'm traveling on business," "I'm on vacation," "I'm in a meeting," etc.).

In addition, certain device modes may be automatically triggered in WCD 100. If, for example, a fire alarm is activated in the building, a transmitted transmission signal may automatically trigger the seeker program in WCD 100 to activate, select the nearest detected fire exit (marked by position marker 1010) and indicate the direction towards this exit. In addition, general information may be provided with this signal instructing user 110 regarding how to remain safe during the emergency.

Figure 11:
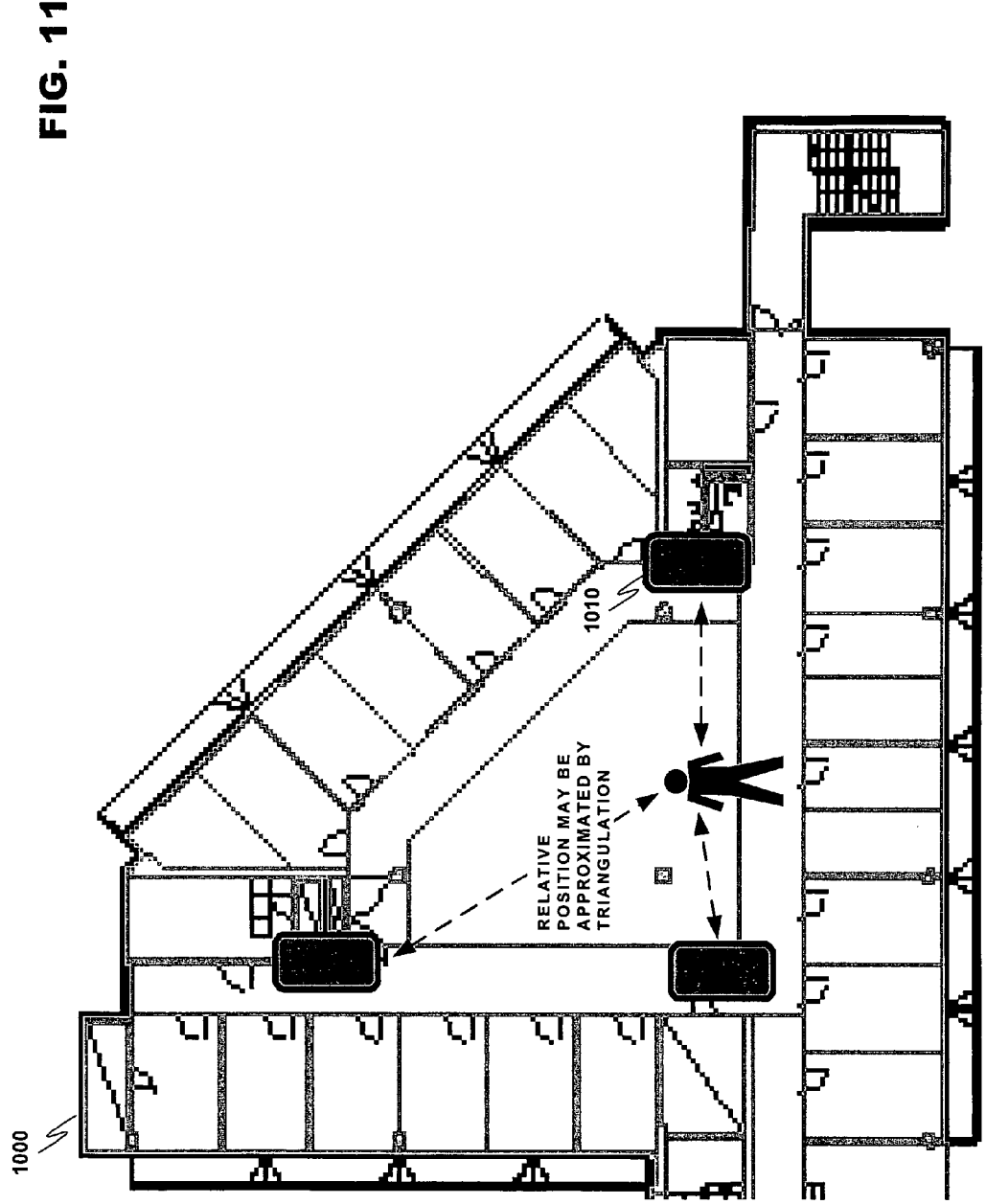
FIG. 11 discloses an example of direction and/or position finding in a building in accordance with the application described in FIG. 10

FIG. 11 discloses an example of location determination in a building navigation system. User 110 may implement a seeker program to indicate both relative direction towards a target and the current position of WCD 100. The current position of WCD 100 may be approximated, for example, through the triangulation of location relative to at least three position markers 1010. FIG. 11 shows user 110 and the location of user 110 approximated in relation to three position markers 1010. This location may be provided in relative terms, for example, that user 110 is a certain distance from a particular position marker, or that the user is in a certain hallway, on a certain floor, in a certain wing, etc. These features may be used in conjunction with a building schematic downloaded to WCD 100 as described above.

Figure 12:
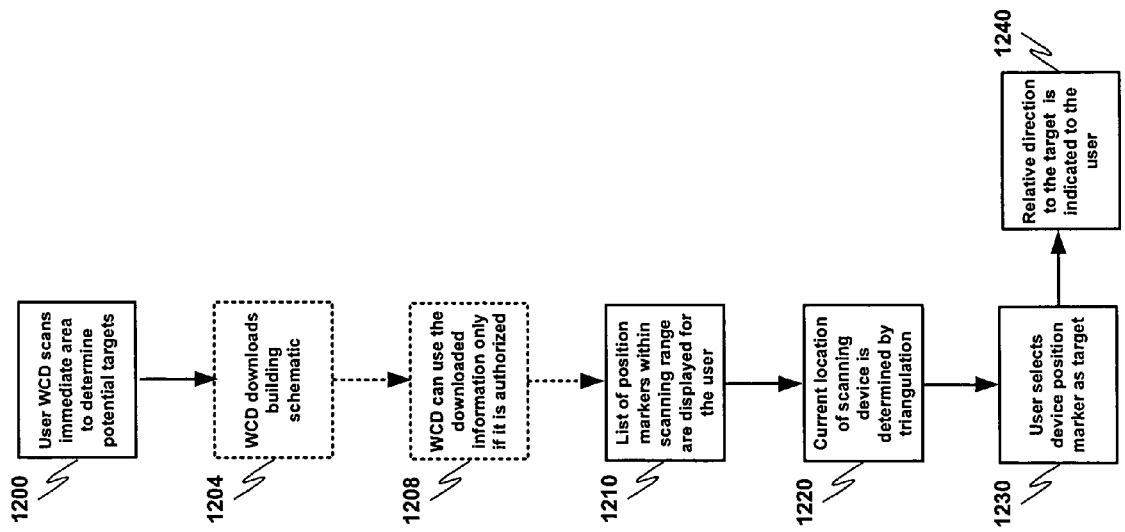
FIG. 12 discloses a process flowchart for executing the exemplary application of FIG. 10.

FIG. 12 discloses a process flowchart in accordance with at least one embodiment of the present invention. In step 1200 the user may activate a seeker program to scan the premises for targets that are currently emitting a position-indicating transmission. An optional step 1204 may provide for downloading a building schematic via wireless communication, if such information is to be made available to WCD 100. As a further security option in step 1208, only if the WCD 100 is authorized, can the discovered position markers 1010 in the building schematic be listed on WCD 100, as provided in step 1210. The authorization in step 1208 can be implemented by encoding the downloaded information so that it is only useable by the receiving WCD 100 if it is authorized, for example, by a pre-stored authorization program. WCD 100 may also estimate its current position by sensing at least three position markers 1010, and using this information in a triangulation process in step 1220. This approximate position information may also be displayed on WCD 100. User 110 may then select from among the discovered position markers 1010 indicated on WCD 100 (step 1230), and WCD 100 may indicate the relative direction towards the position marker from its current position.

Figure 13:
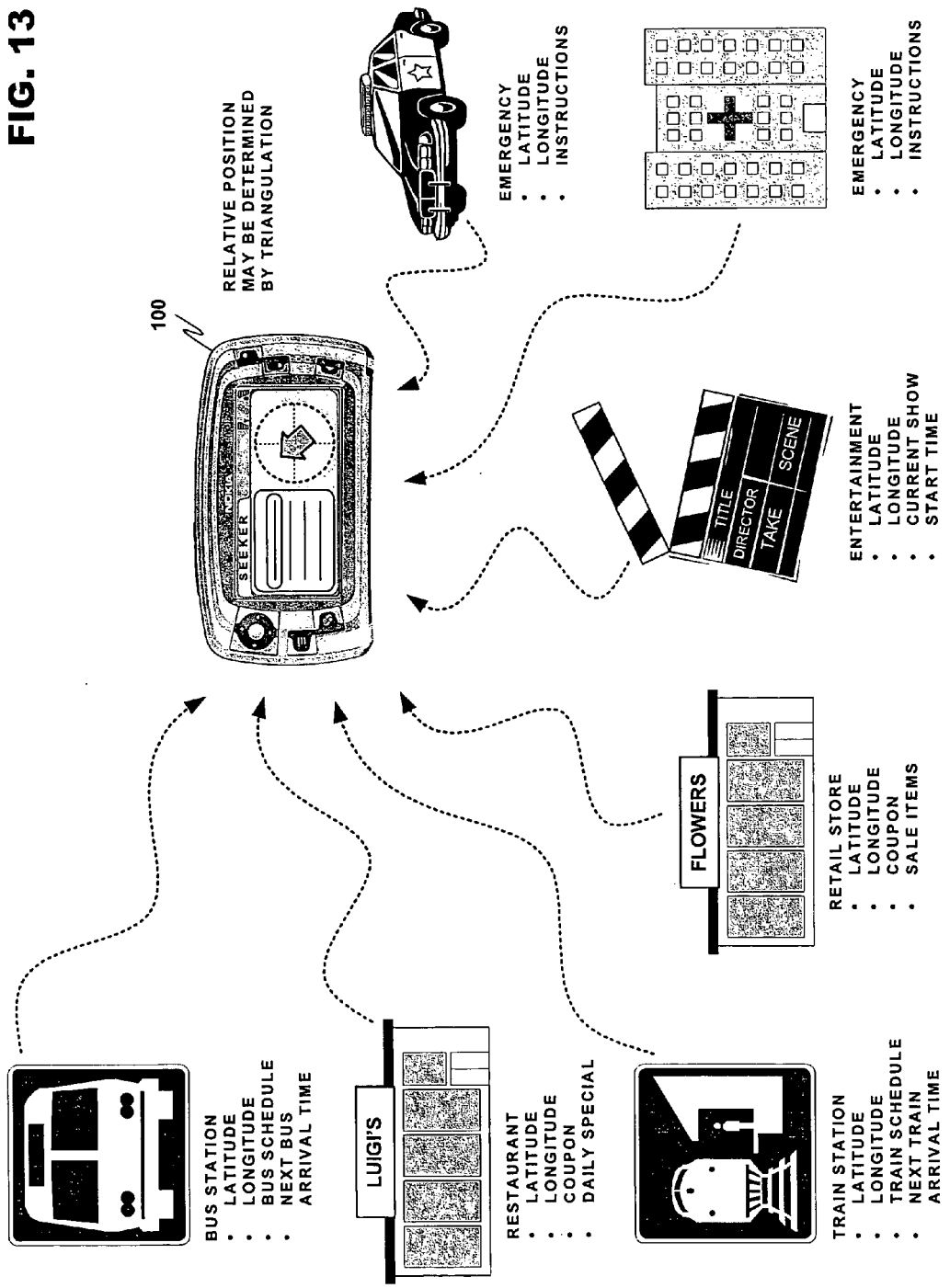
FIG. 13 discloses another exemplary application of the present invention wherein position markers are employed to mark outdoor targets.

VI. An Exemplary Application for Direction Determination in an Outdoors Environment The present invention is also readily applicable to outside direction and position determination. FIG. 13 presents an example. In this scenario, user 110 enters a locality wherein position markers reside 1010 (similar to FIG. 10). However, these targets are installed at various locations throughout the area to provide direction finding to various service providers and locations of public interest.

FIG. 13. discloses examples of position markers that may reside in an outdoors location finding system. These position markers may be placed near locations or items that user 110 may desire to find, and may include an extended range always-on type position-indicating transmission emitter since these units may be hardwired to an external power source. The position markers may include absolute positional coordinates, such as the longitude and latitude of each positional marker. This information may be used to estimate the actual position of user 110 via triangulation. The current position may be updated as user 110 moves throughout the area.

For example, public transportation like a bus or train station may include a position marker. User 110 may activate a seeker application that goes out and gathers information on all available targets within transmission range. This display may be periodically updated as a user travels throughout the area. When a user selects the bus or train station on the display of WCD 100, additional information relevant to these locations may be viewed such as the address location of the station or stop, commuter fairs, schedules, the arrival time of the next bus/train, delay alerts, etc. Likewise, other information may be available for other types of position indicators. The information transmitted by the position markers may be encrypted to restrict the access to authorized devices only.

Retail establishments are another example of an entity that may implement position indication through position markers 1010. FIG. 13 includes examples of a restaurant and a flower shop, but the invention is in no way limited to these types of stores. The restaurant "Luigi's" may provide additional information (besides location information) regarding menu items or a daily special. This information may be useful to user 110 in determining whether to patronize this dining establishment. Likewise, the Flower shop may send additional information that includes items that may be currently discounted as part of a sale. This information is a component of the position-indicating transmission, and is made available on WCD 100 when the user selects to see more information concerning position marker 1010.

Event information may also be available to user 110 via the exemplary outdoor location system. WCD 100 may receive location-indicating transmissions from position markers at a cinema, theatre, arena, etc. The transmission may also include an event schedule, movie show times and ticket prices for various productions. User 110 need only select this position marker on WCD 100 to have WCD 100 indicate the relative direction to position marker 1010 from its current location.

Emergency services may be indicated automatically in the case of a general emergency, or may be selected by user 110 in the case of a personal emergency, accident, etc. The automatic activation of a seeker application and direction indication to a particular position marker 1010 in a general emergency may be triggered by a long-range or short-range transmission signal from a disaster management agency. Position markers 1010 may be installed in a stationary location, such as a hospital emergency room, or in a moving object such as a police car. An advantage of the present invention is that it can display both relative and absolute position, allowing for the tracking of a moving object. The ability to track the current location of the closest police vehicle relative to a current location could be essential in a life-threatening situation. Position markers 1010 for emergency services may further contain location-related information and instruction information regarding procedure for a given emergency (fire, serious weather, terror attacks, etc.)

Figure 14:
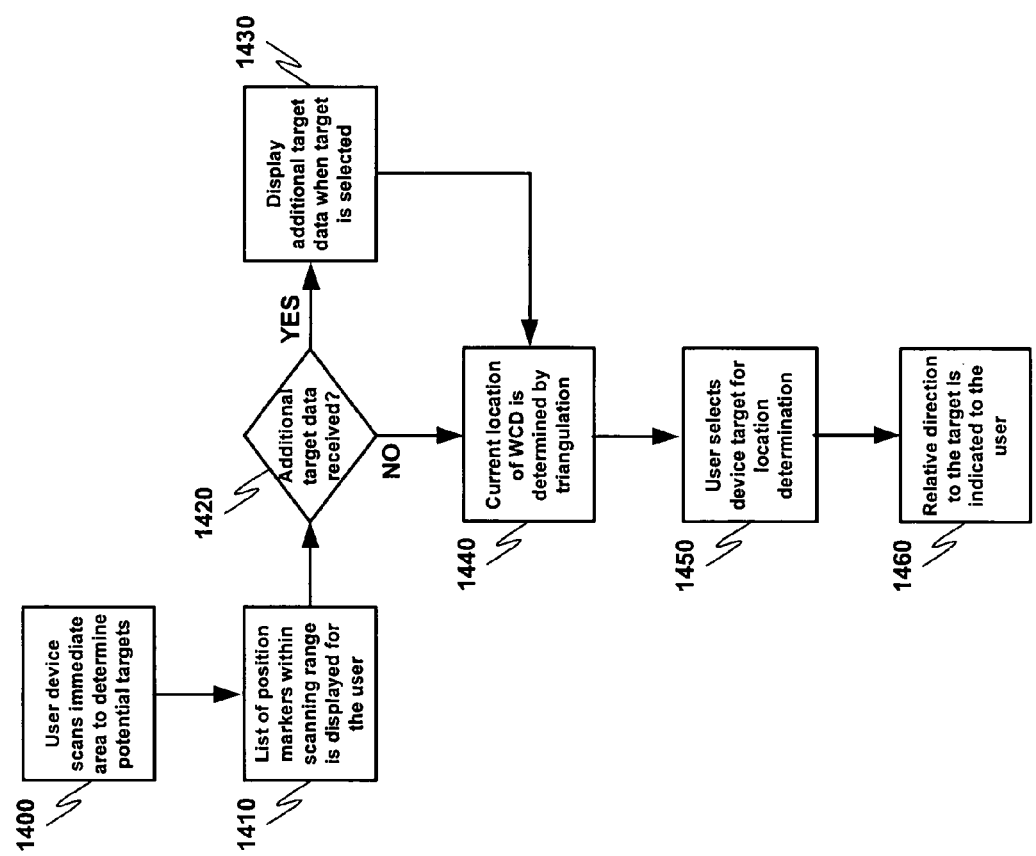
FIG. 14 discloses a process flowchart for executing the exemplary application of FIG. 13.

FIG. 14 discloses an exemplary process flow in accordance with the system of FIG. 13. In step 1400 user 110 activates a seeker application on WCD 100 to scan the immediate area for potential targets. After the list of potential targets is compiled and displayed (step 1410), user 110 may select any of the position markers 1010 to determine if these targets have additional information included relevant to the location "sponsoring" the target. The additional information will be displayed to the user in step 1430 if it was included in the position-indicating transmission. Otherwise, the system proceeds to step 1440, wherein the current location of WCD 100 may be approximated, for example, via triangulation determined from at least three sensed position markers. In step 1450, user 110 selects from among the indicated position markers 1010 to indicate to WCD 100 the target to which the relative direction is sought. WCD 100 responds in step 1460 by monitoring and processing the position-indicating transmission from the selected position marker and indicating the relative direction towards that position marker.

Figure 15:
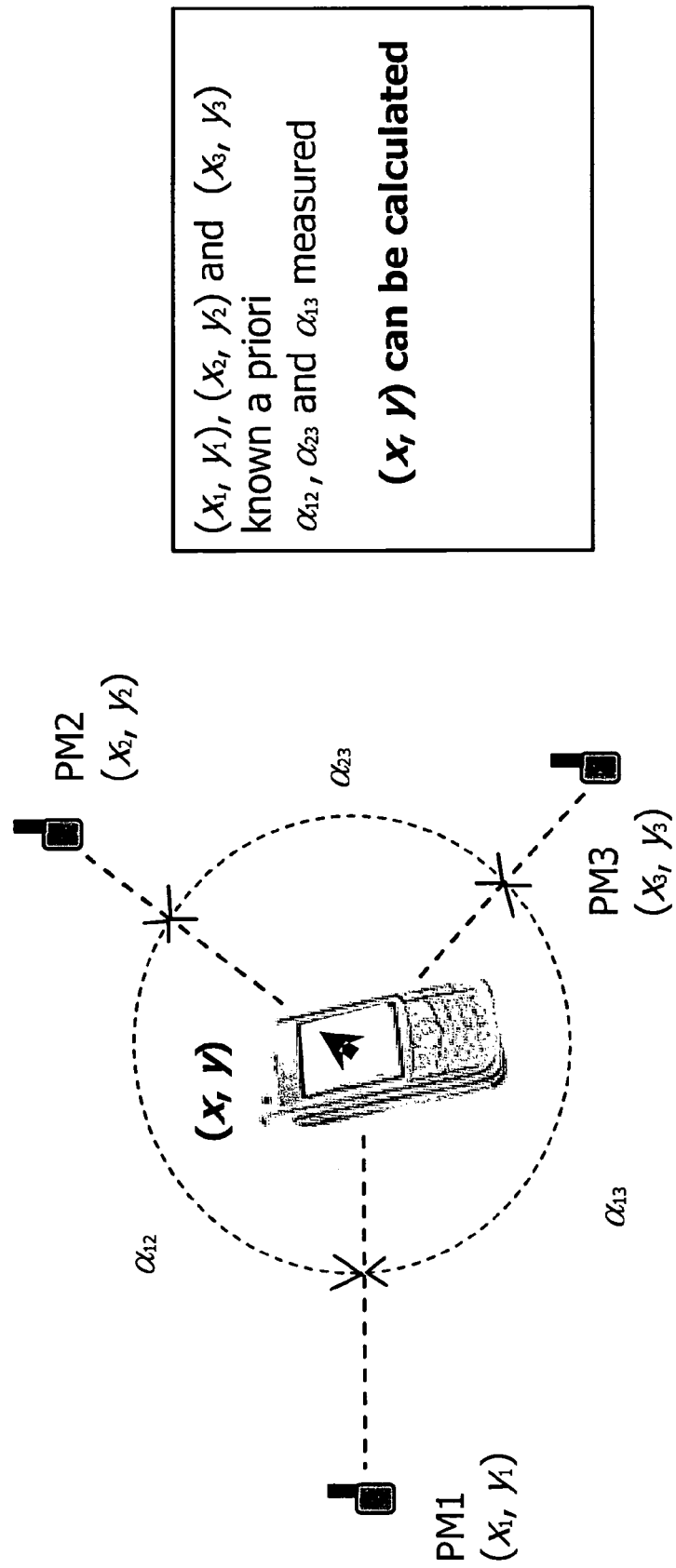
FIG. 15 illustrates triangulation based on angles.

FIG. 15 illustrates triangulation based on angles. The coordinates $(x_1,y_1)$, $(x_2,y_2)$, and $(x_3,y_3)$ of the position markers (PM1, PM2, PM3) are known a priori. $\alpha_{12}$, $\alpha_{23}$, and $\alpha_{13}$ are measured. Then location of the WCD 100 (x,y) can be calculated. Only two position marker directions need to be measured if the device has a compass. In addition to location the invention can solve the orientation of the device. The orientation can be solved in relative terms and also in the geographical coordinate system (relative to North), provided that the latitude and longitude of the position markers is known.

In addition to finding services based on signals received directly from position markers located at the service location, other aspects of the invention include the following implementations:

The user can get information also about services, which are currently outside the operational range of the system. This is carried out in at least three ways:

1. The position markers broadcast information not only about themselves, but also about other close-by services, whose position markers are still too far away for their signals to be received by the device. Also the local map/building floor plan information can be transmitted, including the position marker positions.

2. The device downloads information of services in a certain area, as well as the local map/building floor plan, plus the position marker locations, e.g. through GPRS, WLAN, or some other connection from a remote database. The information may contain locations and other information of potential targets that are moving, such as taxis and buses. This information may originate from the GPS system or some other location system.

3. Information of any fixed services and other potential targets, as well as maps and building floor plans may also reside locally within the user device.

After selecting a service or location from the list or from the map, and using the location and orientation determining capability offered by the position markers between the current user location and the target location, the user is able to receive navigation instructions towards any service location in the area (known by the user by e.g. either of the three means mentioned above), including those that would be currently out of the operational range of the direction finding system.

The navigation instructions are given e.g. by showing a map or floor plan (oriented according to the real orientation of the user) and by pointer arrows showing the directions in which the user should proceed to reach the desired destination.

When arriving close to the target, the user is guided directly to the target by using a position marker located at the target, provided that the target is equipped with a position marker.

The present invention provides an improvement over current location systems due to its ability to satisfy a multitude of requirements for a user. The present invention allows a user to find both locations and objects. Personal objects may be located within a short transmission range if the object includes a low power position-indicating transmission emitter. In some cases these signal emitters may be activated via a wireless message or a transponder signal. Further, a wireless communication device owned or controlled by another user may be located after permission is requested via a wireless message. The present invention also allows a user to find places, regardless of whether these locations are currently known or unknown to a user. The user may select from a list of all potential targets found in a given area, and may view information on each of these targets received as part of the position indicating signal. Since, according to at least one embodiment of the present invention, a wireless communication device may show both relative and absolute position, moving targets may be tracked. In another beneficial application, emergency situations may automatically trigger a wireless communication device to indicate a route to safety. All of these combined features may be implemented using embodiments of the present invention, which enables the determination of both direction towards a selected target and the current position of a seeking device, both inside and outside a structure. As a result, the present invention exceeds the current abilities of known location determination systems.

Accordingly, it will be apparent to persons skilled in the relevant art that various changes in forma and detail can be made therein without departing from the spirit and scope of the invention. The breadth and scope of the present invention should not be limited by any of the above-described exemplary embodiments, but should be defined only in accordance with the following claims and their equivalents.

The invention claimed is:

1. A method, comprising:
receiving transmissions comprising target identification information and data configured for use in direction of arrival estimation from targets within transmission range of a searching device;
displaying, on the searching device, a list of targets from which transmissions were received;
sending, if a desired target is missing from the list of targets, a wireless request message to activate a transmission or change transmitted signal properties in the desired target from the searching device so that the desired target may appear in the list of targets;
selecting, on the searching device, a target from the list of targets;
determining a direction from which determining, at the searching device, a relative direction from which the transmissions corresponding to the selected target were received based only on the received transmissions; and
indicating, on the searching device, the relative direction.

2. The method of claim 1, wherein the transmissions from targets are received via wireless communication selected from the group consisting of short-range communication and long-range communication.

3. The method of claim 2, wherein the short-range wireless communication is selected from the group consisting of Bluetooth™, BTLEE/BluLite, ZigBee/IEEE 802.15.4, WLAN, UWB, and UHF RFID communication.

4. The method of claim 1, wherein the transmissions include specific information related to a target aside from target location.

5. The method of claim 4, wherein the specific information related to the target is displayed when the device is selected on the searching device.

6. The method of claim 1, wherein the request message is sent via wireless communication to remotely activate a transmission in the desired target or change transmitted signal properties in the desired target.

7. The method of claim 1, wherein the request message is sent via wireless communication to request that the owner of the desired target grant permission to locate the target, which if accepted, results in the activation of a transmission for the desired target or a change in the transmitted signal properties of the desired target.

8. The method of claim 1, further comprising displaying a current location for the searching device with respect to the target.

9. The method of claim 1, wherein the transmissions contain at least information about the target location.

10. The method of claim 1, wherein the transmissions are encrypted to be accessed by authorized devices only.

11. The method of claim 1, further comprising displaying the current orientation of the searching device.

12. A computer program product comprising computer executable program code recorded on a computer readable storage medium, the computer executable program code comprising:
   code configured to receive transmissions comprising target identification information and data configured for use in direction of arrival estimation from targets within transmission range of a searching device;
   code configured to display, on the searching device, a list of targets from which transmissions were received;
   code configured to send, if a desired target is missing from the list of targets, a wireless request message to activate a transmission or change transmitted signal properties in the desired target from the searching device so that the desired target may appear in the list of targets;
   code configured to select, on the searching device, a target from the list of targets;
   code configured to determine, at the searching device, a relative direction from which the transmissions corresponding to the selected target were received based only on the received transmissions; and
   code configured to indicate, on the searching device, the relative direction.

13. The computer program product of claim 12, wherein the transmissions include specific information related to a target aside from target location.

14. The computer program product of claim 13, wherein the specific information related to the target is displayed when the device is selected on the searching device.

15. The computer program product of claim 12, wherein the request message is sent via wireless communication to remotely activate a transmission in the desired target or change transmitted signal properties in the desired target.

16. The computer program product of claim 12, wherein the request message is sent via wireless communication to request that the owner of the desired target grant permission to locate the target, which if accepted, results in the activation of a transmission for the desired target.

17. The computer program product of claim 12, further comprising displaying a current location for the searching device with respect to the target.

18. The computer program product of claim 12, wherein the transmissions contain at least information about the target location.

19. The computer program of claim 12, wherein the transmissions are encrypted to be accessed by authorized devices only.

20. A system, comprising:
   targets;
   a searching device;
   the searching device receiving transmissions comprising target identification information and data configured for use in direction of arrival estimation from the targets within transmission range of a searching device;
   the searching device displaying, on the searching device, a list of the targets from which transmissions were received;
   the searching device sending, if a desired target is missing from the list of targets, a request message to activate a transmission in the missing target or change transmitted signal properties in the desired target so that the missing target may appear in list of active targets;
   the searching device further selecting a target from the list of targets, determining a relative direction from which the transmissions corresponding to the selected target were received based only on the received transmissions and indicating the relative direction.

21. The system of claim 20, wherein the searching device is wireless communication device capable of communicating via at least one of long-range, short-range or near field communication.

* * * * *

UNITED STATES PATENT AND TRADEMARK OFFICE
CERTIFICATE OF CORRECTION

PATENT NO. : 7,667,646 B2 Page 1 of 1
APPLICATION NO. : 11/357165
DATED : February 23, 2010
INVENTOR(S) : Kalliola et al.

It is certified that error appears in the above-identified patent and that said Letters Patent is hereby corrected as shown below:

Column 20

Line 32 (Claim 1), "determining a direction from which, determining, at the" should read, --determining, at the--.

Signed and Sealed this

Eleventh Day of May, 2010

David J. Kappos
*Director of the United States Patent and Trademark Office*